(12) United States Patent
Todd

(10) Patent No.: US 8,984,031 B1
(45) Date of Patent: Mar. 17, 2015

(54) MANAGING DATA STORAGE FOR DATABASES BASED ON APPLICATION AWARENESS

(75) Inventor: Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 579 days.

(21) Appl. No.: 12/893,697

(22) Filed: Sep. 29, 2010

(51) Int. Cl.
*G06F 17/30* (2006.01)

(52) U.S. Cl.
USPC .......................................... 707/823; 707/825

(58) Field of Classification Search
USPC ................................................. 707/825, 823
See application file for complete search history.

(56) References Cited

U.S. PATENT DOCUMENTS

| | | | |
|---|---|---|---|
| 6,523,036 B1* | 2/2003 | Hickman et al. | 707/704 |
| 7,027,439 B1* | 4/2006 | Barrow et al. | 370/389 |
| 7,523,231 B1* | 4/2009 | Gupta et al. | 710/36 |
| 8,219,724 B1* | 7/2012 | Caruso et al. | 710/36 |
| 8,438,342 B1* | 5/2013 | Todd et al. | 711/153 |
| 2003/0093647 A1* | 5/2003 | Mogi et al. | 712/1 |
| 2004/0059864 A1* | 3/2004 | Hardman et al. | 711/5 |
| 2006/0074941 A1* | 4/2006 | Flynn et al. | 707/100 |
| 2007/0192328 A1* | 8/2007 | Handa et al. | 707/10 |
| 2008/0140906 A1* | 6/2008 | Serizawa et al. | 711/6 |
| 2009/0043878 A1* | 2/2009 | Ni | 709/223 |
| 2009/0257416 A1* | 10/2009 | Walker et al. | 370/338 |
| 2010/0257539 A1* | 10/2010 | Narayanan et al. | 719/311 |
| 2011/0231606 A1* | 9/2011 | Kavuri et al. | 711/114 |

OTHER PUBLICATIONS

Mesnier, Object-Based Storage, IEEE Communications Magazine, Aug. 2003, pp. 84-90.*

* cited by examiner

*Primary Examiner* — Albert Phillips, III
(74) *Attorney, Agent, or Firm* — Daniel P. McLoughlin; Jason A. Reyes; Krishnendu Gupta

(57) ABSTRACT

A method is used in managing data storage for databases based on application awareness. Content is received via any of a file system interface, a block based interface, and an object based interface to a data storage system, which executes a general purpose operating system. Based on software installed on the data storage system and running on the general purpose operating system, an application-aware management interface is used to provide a database interface to the data storage system. Based on the database interface, database queries are accepted at the data storage system.

20 Claims, 18 Drawing Sheets

MANAGING DATA STORAGE FOR DATABASES BASED ON APPLICATION AWARENESS

BACKGROUND

1. Technical Field

This application relates to managing data storage for databases based on application awareness.

2. Description of Related Art

Storage devices are employed to store data that is accessed by computer systems. Examples of basic storage devices include volatile and non-volatile memory, floppy drives, hard disk drives, tape drives, optical drives, etc. A storage device may be locally attached to an input/output (I/O) channel of a computer. For example, a hard disk drive may be connected to a computer's disk controller.

As is known in the art, a disk drive contains at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

A storage device may also be accessible over a network. Examples of such a storage device include network attached storage (NAS) and storage area network (SAN) devices. A storage device may be a single stand-alone component or be comprised of a system of storage devices such as in the case of Redundant Array of Inexpensive Disks (RAID) groups.

Virtually all computer application programs rely on such storage devices which may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume ("LUN") and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping technology may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

Some storage systems receive and process access requests that identify data organized by file system. A file system is a logical construct that translates physical blocks of storage on a storage device into logical files and directories. In this way, the file system aids in organizing content stored on a disk. For example, an application program having ten logically related blocks of content to store on disk may store the content in a single file in the file system. Thus, the application program may simply track the name and/or location of the file, rather than tracking the block addresses of each of the ten blocks on disk that store the content.

File systems maintain metadata for each file that, inter alia, indicates the physical disk locations of the content logically stored in the file. For example, in UNIX file systems an mode is associated with each file and stores metadata about the file. The metadata includes information such as access permissions, time of last access of the file, time of last modification of the file, and which blocks on the physical storage devices store its content. The file system may also maintain a map, referred to as a free map in UNIX file systems, of all the blocks on the physical storage system at which the file system may store content. The file system tracks which blocks in the map are currently in use to store file content and which are available to store file content.

When an application program requests that the file system store content in a file, the file system may use the map to select available blocks and send a request to the physical storage devices to store the file content at the selected blocks. The file system may then store metadata (e.g., in an mode) that associates the filename for the file with the physical location of the content on the storage device(s). When the file system receives a subsequent request to access the file, the file system may access the metadata, use it to determine the blocks on the physical storage device at which the file's content is physically stored, request the content from the physical storage device(s), and return the content in response to the request.

In general, since file systems provide computer application programs with access to data stored on storage devices in a logical, coherent way, file systems hide the details of how data is stored on storage devices from application programs. For instance, storage devices are generally block addressable, in that data is addressed with the smallest granularity of one block; multiple, contiguous blocks form an extent. The size of the particular block, typically 512 bytes in length, depends upon the actual devices involved. Application programs generally request data from file systems byte by byte. Consequently, file systems are responsible for seamlessly mapping between application program address-space and storage device address-space.

File systems store volumes of data on storage devices, i.e., collections of data blocks, each for one complete file system instance. These storage devices may be partitions of single physical devices or logical collections of several physical devices. Computers may have access to multiple file system volumes stored on one or more storage devices.

File systems maintain several different types of files, including regular files and directory files. Application programs store and retrieve data from regular files as contiguous, randomly accessible segments of bytes. With a byte-addressable address-space, applications may read and write data at any byte offset within a file. Applications can grow files by writing data to the end of a file; the size of the file increases by the amount of data written. Conversely, applications can truncate files by reducing the file size to any particular length. Applications are solely responsible for organizing data stored within regular files, since file systems are not aware of the content of each regular file.

Files are presented to application programs through directory files that form a tree-like hierarchy of files and subdirectories containing more files. Filenames are unique to directories but not to file system volumes. Application programs identify files by pathnames comprised of the filename and the names of all encompassing directories. The complete directory structure is called the file system namespace. For each file, file systems maintain attributes such as ownership information, access privileges, access times, and modification times.

I/O interfaces transport data among the computers and the storage devices. Traditionally, interfaces fall into two categories: channels and networks. Computers generally communicate with storage devices via channel interfaces. Channels predictably transfer data with low-latency and high-bandwidth performance; however, channels typically span short distances and provide low connectivity. Performance requirements often dictate that hardware mechanisms control channel operations. The Small Computer System Interface (SCSI) is a common channel interface. Storage devices that are connected directly to computers are known as direct-attached storage (DAS) devices.

Computers communicate with other computers through networks. Networks are interfaces with more flexibility than channels. Software mechanisms control substantial network operations, providing networks with flexibility but large latencies and low bandwidth performance. Local area networks (LAN) connect computers medium distances, such as within buildings, whereas wide area networks (WAN) span long distances, like across campuses or even across the world. LANs normally consist of shared media networks, like Ethernet, while WANs are often point-to-point connections, like Asynchronous Transfer Mode (ATM). Transmission Control Protocol/Internet Protocol (TCP/IP) is a popular network protocol for both LANs and WANs. Because LANs and WANs utilize very similar protocols, for the purpose of this application, the term LAN is used to include both LAN and WAN interfaces.

Recent interface trends combine channel and network technologies into single interfaces capable of supporting multiple protocols. For instance, Fibre Channel (FC) is a serial interface that supports network protocols like TCP/IP as well as channel protocols such as SCSI-3. Other technologies, such as iSCSI, map the SCSI storage protocol onto TCP/IP network protocols, thus utilizing LAN infrastructures for storage transfers.

In at least some cases, SAN refers to network interfaces that support storage protocols. Storage devices connected to SANs are referred to as SAN-attached storage devices. These storage devices are block and object-addressable and may be dedicated devices or general purpose computers serving block and object-level data.

Distributed file systems provide users and application programs with transparent access to files from multiple computers networked together. Distributed file systems may lack the high-performance found in local file systems due to resource sharing and lack of data locality. However, the sharing capabilities of distributed file systems may compensate for poor performance.

Architectures for distributed file systems fall into two main categories: NAS-based and SAN-based. NAS-based file sharing places server computers between storage devices and client computers connected via LANs. In contrast, SAN-based file sharing, traditionally known as "shared disk" or "share storage", uses SANs to directly transfer data between storage devices and networked computers.

NAS-based distributed file systems transfer data between server computers and client computers across LAN connections. The server computers store volumes in units of blocks on DAS devices and present this data to client computers in a file-level format. These NAS servers communicate with NAS clients via NAS protocols. Both read and write data-paths traverse from the clients, across the LAN, to the NAS servers. In turn, the servers read from and write to the DAS devices. NAS servers may be dedicated appliances or general-purpose computers.

NFS is a common NAS protocol that uses central servers and DAS devices to store real-data and metadata for the file system volume. These central servers locally maintain metadata and transport only real-data to clients. The central server design is simple yet efficient, since all metadata remains local to the server. Like local file systems, central servers only need to manage metadata consistency between main memory and DAS devices. In fact, central server distributed file systems often use local file systems to manage and store data for the file system. In this regard, the only job of the central server file system is to transport real-data between clients and servers.

SAN appliances are prior art systems that consist of a variety of components including storage devices, file servers, and network connections. SAN appliances provide block-level, and possibly file-level, access to data stored and managed by the appliance. Despite the ability to serve both block-level and file-level data, SAN appliances may not possess the needed management mechanisms to actually share data between the SAN and NAS connections. The storage devices are usually partitioned so that a portion of the available storage is available to the SAN and a different portion is available for NAS file sharing. Therefore, for the purpose of this application, SAN appliances are treated as the subsystems they represent.

Another adaptation of a SAN appliance is simply a general purpose computer with DAS devices. This computer converts the DAS protocols into SAN protocols in order to serve block-level data to the SAN. The computer may also act as a NAS server and serve file-level data to the LAN.

File system designers can construct complete file systems by layering, or stacking, partial designs on top of existing file systems. The new designs reuse existing services by inheriting functionality of the lower level file system software. For instance, NFS is a central-server architecture that utilizes existing local file systems to store and retrieve data from storage device attached directly to servers. By layering NFS on top of local file systems, NFS software is free from the complexities of namespace, file attribute, and storage management. NFS software consists of simple caching and transport functions. As a result, NFS benefits from performance and recovery improvements made to local file systems.

All database management systems (DBMSs) store and manipulate information. The relational approach to database management represents all information as "tables". A "database" is a collection of tables, each table having rows and columns. In a relational database, the rows of a table represent records (collections of information about separate items) and the columns represent fields (particular attributes of a record). In conducting searches, a relational database matches information from a field (column) in one table with information from a corresponding field (column) of another table to produce a third table that combines requested data from both tables.

All database management systems have some mechanism for getting at the information stored in a database. Such a mechanism involves specifying data retrieval operations, often called "queries" as described below, to search the database and then retrieve and display the requested information.

All databases require a consistent structure, termed a schema, to organize and manage the information. In a relational database, the schema is a collection of tables. Similarly, for each table, there is generally one schema to which it belongs. Once the schema is designed, the DBMS is used to build the database and to operate on data within the database.

Conventional client/server distributed systems provide a centralized data storage and access facility that can serve as a DBMS, for managing information in response to data queries and update transactions. As used herein, the terms "data query" or "query" mean read-only requests for data and the terms "update transaction" or "transaction" mean any read-write operations involving changes to the data stored in the database. Client systems are connected to a network, which is connected to an application server. The client systems have client software for interfacing with server software on the application server. The client software could be any software application or module providing a user interface for issuing data queries or update transactions, such as for example, DBMS-specific client applications or more generally a Web browser application. Similarly, the server software could be a software application provided specifically for processing users' database requests or could be an application capable of providing more generalized services, such as a web server.

The application server is connected to a DBMS server, which has a data store. The DBMS server has DBMS software for managing data in the data store. DBMS software is available from many vendors, for example, Oracle Corp. of Redmond Shores, Calif., Sybase Inc. of Dublin, Calif., and International Business Machines Corp. of Armonk, N.Y., among others. As known in the art, the application server and the DMBS server could be the same computer system or different computer systems. Moreover, the application server and the DBMS server could be in the same facility, or they could be located in physically separated facilities.

A challenge with such centralized DBMSs is the limited capacity for handling a very large number of data queries or transactions. By increasing the computing power of the computer host serving the DBMS one can improve the DBMS's capacity. However, even with capital investments in advanced hardware, a company will see limited returns in terms of increased DBMS capacity.

In an attempt to provide increased capacity, some conventional client/server applications have implemented replicated DBMS systems. In such systems, multiple DBMS servers and data stores are use used to process user data queries and update transactions. With database replication, a single DBMS can be split into two or more participating systems. Each system handles a portion of the stored data as the "primary" resource, while others also store the data as a "secondary" resource. This provides both fault-tolerance (because of the duplicated data storage) and load balancing (because of the multiple resources for queries and updates).

In an example, when client systems are connected to a network, the client systems send data queries and update transactions to an application server, also connected to the network. The application server is connected to first and second DBMS servers via a load balancer and a switch. The first DBMS server has a primary database in one data store and a secondary database in another data store. Similarly, the second DBMS server has a primary database in one data store and a secondary database in another data store. In many replicated DBMS systems, the primary database served by one DBMS server is a secondary database served by a different server. For example, the primary database of the first DBMS server may be a replica of the secondary database of the second DBMS server, and the secondary database of the first DBMS server may be a replica of the primary database of the second DBMS server. In this manner, both DBMS servers can accommodate user requests thereby providing increased capacity. When the application server receives a user request, it passes the request on to the load balancer. The load balancer tracks the performance and loading of the DBMS servers to determine which server should be assigned the request. The switch provides increased communications bandwidth by separating the traffic according to the server designated to receive the request from load balancer.

Database replication has been an attractive technology for businesses that need increased reliability of database access (redundancy) or increased capacity beyond that available in one machine or locality (scalability). Although the concept of splitting the DBMS across multiple systems is simple, implementation has proved to be very complex. This complexity is realized in the form of additional systems management and programming effort. Even with this increased investment and complexity, it is recognized that many DBMS systems cannot adequately be scaled beyond two coupled systems.

The data flow in conventional DBMS systems generally follows the following steps carried out during a simple database query by a client system. As would be apparent to those skilled in the art, additional steps may be necessary for more complex queries or for database update transactions. In any event, the basic communication flow across a boundary between the client system and the application server and across another boundary between the application server and the DBMS server is representative of at least many conventional DBMS systems.

The client system issues an application-specific request to the application server. The application server receives the request from the client system and forwards the request to the DBMS server via a conventional client application programming interface (API). In the present example, the client API is a Java database connectivity (JDBC) client driver. As known in the art, APIs are language and message formats or protocols used by one application program to communicate with another program that provides services for it. APIs allow application programs to be written according to a defined standard thereby simplifying the communications between applications. Another API commonly used for database systems is the open database connectivity driver (ODBC).

The DBMS server receives the request from the application server via a server API, which may be for example, a JDBC server driver. The DBMS server executes the database query to retrieve results requested by the client. The DBMS server sends the results back to the application server via the server API (e.g., a JDBC server driver). The application server receives the results via the client API (e.g., a JDBC client driver). The application server formats the results and sends them to the client system, which receives the results requested.

Recently developed technology (e.g., Greenplum Database) provides a system and method to transparently distribute DBMS resources across multiple platforms and multiple data servers, making them broadly accessible by dispersed users and developers over networks such as the Internet. This technology extends a centralized DBMS system by adding a Resource Abstraction Layer (RAL) to a conventional database driver normally used to access a DBMS. The RAL implements DBMS resources that mirror the functionality of a centralized DBMS, but may be physically located at different networked locations. The RAL allows a plurality of remote server units (RSUs), implemented throughout the network, which receive and respond to data requests in place of the DBMS server. Each RSU maintains a database cache of recently accessed data from which incoming requests may be satisfied and can process database requests on behalf of the DBMS server. The DBMS server is contacted only if the RSU cannot respond to the request with cached data. In this case, the DBMS server processes the request as if it had been received directly from the application server. Once the DBMS server has retrieved the results of the request, it sends them back to the RSU. The RSU provides the results to the application server and stores the data in the database cache for use with future requests.

Using this technology, distributed DBMS resources can be allocated using policies implemented within the RAL. For example an RAL may distribute data requests according to geographic location, priority, time-of-day and server load. The RAL maps distribution policies to physically distributed DBMS resources (RSUs) by managing data structures that represent the state of available RSU resources. Accordingly, this technology replaces what would normally be a singular resource with one that conforms to the policy. Policies may be entered or changed while the systems are running.

This technology provides application developers with the important feature of transparency of the underlying database architecture. That is, an application program can take advantage of the benefits of load balancing and fault tolerance without the necessity for architecture-specific software coding.

SUMMARY OF THE INVENTION

A method is used in managing data storage for databases based on application awareness. Content is received via any of a file system interface, a block based interface, and an object based interface to a data storage system, which executes a general purpose operating system. Based on software installed on the data storage system and running on the general purpose operating system, an application-aware management interface is used to provide a database interface to the data storage system. Based on the database interface, database queries are accepted at the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing data storage for databases based on application awareness, which technique may be used to help provide, among other things, application-aware management and scaling of a storage-embedded database. In at least one implementation, wherein database logic is provided in a data storage system, application-aware storage provisioning simplifies a database configuration process, and application-aware "join" allows new systems to easily scale an application database to span storage systems. Conventionally, database management software requires setting up rows/tables, specifying which devices store the rows/tables, and manually entering the address of new storage that is added. By contrast, by use of the technique described herein, a storage-resident database can be provisioned in the terms of the application that is using it, with tables and storage space being automatically allocated and generated. Further with respect to this provisioning, when database capacity in the form of new data storage is added for this application, the new data storage is simply instructed to "join" this application, and the provisioning, allocation, and generation steps are processed automatically.

Figure 1:
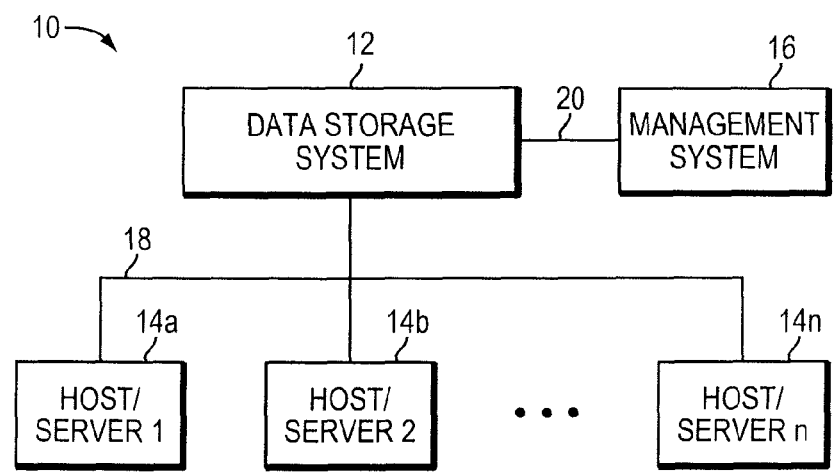
FIG. 1 is an example of an embodiment of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing I/O operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 20 may be a LAN connection and the communication medium 18 may be an iSCSI or Fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein. As an example in connection with a medical office application server component that may executed on one or more of the hosts 14a-14n, the data storage configuration tasks may include allocating or provisioning storage for storing patient medical data such as, for example, name, address, insurance information, office visit dates, vaccination records, payments, image files containing x-rays, and the like. Tasks performed in connection with provisioning storage to store patient medical data for the medical office application may include, for example, specifying the devices (logical and/or physical) used to store the data, configuring the data storage devices used such as specifying whether data replication is performed for disaster recovery, and the like. Processes that may be used in connection with performing data storage provisioning and configuration are described in more detail in following paragraphs.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems, such as data storage arrays, offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Described in following paragraphs are processes that may be used to assist customers of a data storage system in connection with performing data storage services such as related to data storage system configuration, provisioning of data storage, and the like. The processes herein are adaptable to the particular knowledge level of the user. The processes are flexible and allow for implementation of best practices and defaults in an automated fashion which are customized for the particular application, user or customer, and/or underlying data storage system and environment to meet specific customer needs. As will be described in more detail, depending on the level at which a user interacts with the data storage system, different levels or amounts of automation of the best practices may be performed. The user may elect to bypass the automation of best practices or limit the amount of automation performed by interacting with the system at various levels.

Figure 2:
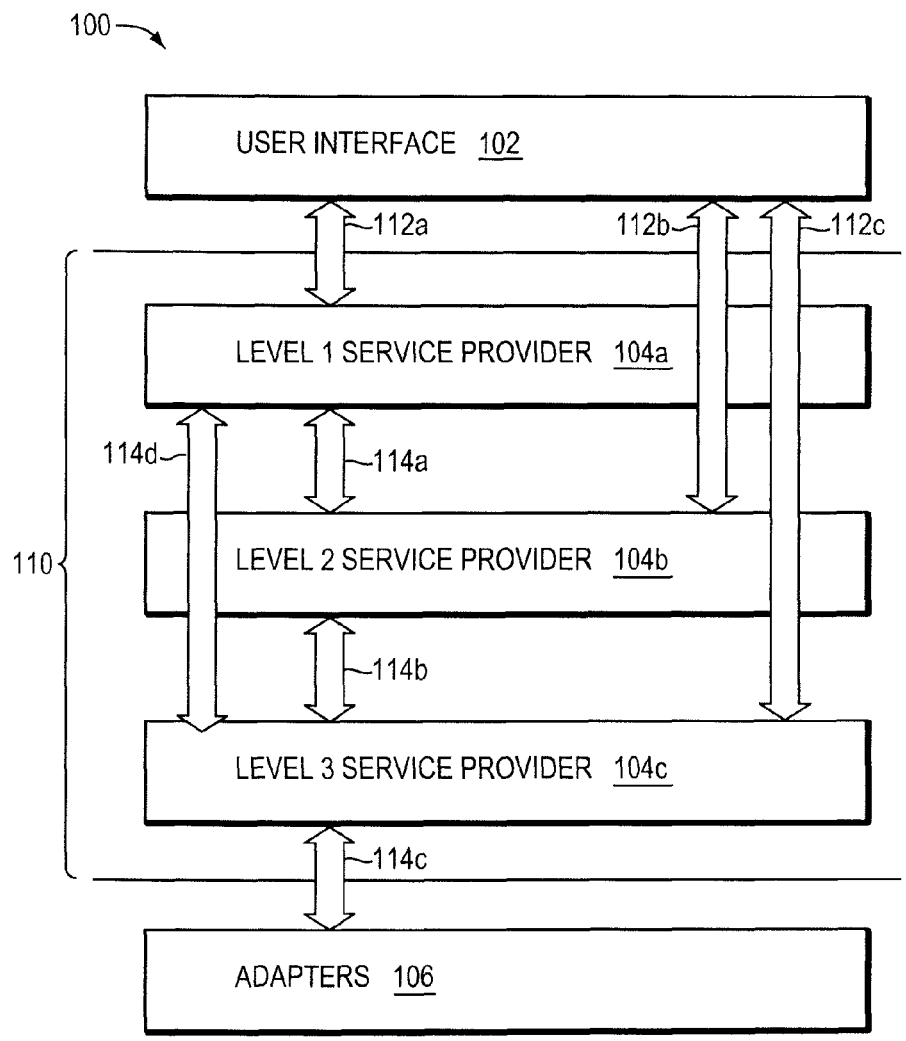
FIGS. 2 and 3 are examples of components that may be included on the data storage system for use in performing the techniques herein.

Referring to FIG. 2, shown is an example representation of components that may be included on the data storage system 12 for use in performing the processes herein for data storage configuration. The example 100 includes a user interface 102, one or more levels of service providers 110, and adapters 106. In the example 100, the element 110 includes 3 service provider layers or levels 104a-104c. It should be noted that although 3 service provider levels are shown in FIG. 2, an embodiment may include any number of service provider levels.

The adapters 106 are used in connection with facilitating communications between the service providers, such as the level 3 service provider 104c, and other components. The different service providers included in the example 100 may be able to communicate directly with one another. However, when one of the service providers at one of the levels communicates with another component other than one of the service providers, an adapter may be utilized. An adapter may be characterized as a layer of software between one of the service providers, such as service provider 104c, and another component, such as a lower-level component invoked to implement data storage platform specific functionality. An adapter 106 may convert a service provider API to the API of another component. As an example, the service provider 104c may perform a call to an external component to create a file system. An adapter 106 may be used as an intervening layer between 104c and the external component in which the adapter 106 converts the API call from 104c to the API of the external component. The conversion may include, for example, mapping parameters between the API calls, performing multiple calls to the external component for the one API call from 104c, and the like. It should be noted that an adapter 106 may not utilized if such conversion is not needed.

The user interface (UI) 102 provides for one or more different types of user interfaces and associated data. For example, the UI 102 may provide support for a graphical user interface (GUI), command line interface (CLI), and the like, to support interactions between the data storage system 12 and the hosts 14a-14n of FIG. 1. Each of the different service provider levels of 110 may provide a different logical view and level of abstraction with respect to a data storage configuration task to be performed for an application executing on one of the hosts. A user may interact through the UI 102 with any one of the different levels of service providers 104a-104c when performing data storage configuration requests. Each of the service providers of 110 may provide a different level of detail or abstraction with respect to the underlying operations and tasks performed on the data storage system in accordance with different levels of user sophistication and knowledge. As will be described in more detail below, the language or terminology, UI data (e.g., content or data used to populate the UI menus), and UI presentation or structure (e.g., commands presented or particular hierarchical menu structure) may vary in accordance with the particular level of service provider selected by the user. Thus, a user may interact with the data storage system at a variety of different levels when issuing data storage configuration requests for the same application. The UI may be customized for the particular level and application for which the request is performed.

In an embodiment, the UI 102 may be characterized a set of different user interfaces that may vary depending on the target user and associated user level at which the user interacts with the system. As described in more detail in following paragraphs, each level may provide a different user interface for a different level of user interaction and level of knowledge and sophistication. Each level may also be associated with a different level of automation of the best practices, for example, with users interacting at level 1 obtaining the greatest amount of automation of best practices and users interacting at level 3 obtaining none or minimal amount of automation. The UI 102 may provide multiple different user interfaces in accordance with the different levels allowing a user the option of connecting and interacting with the data storage system at any level. By allowing a user to select a level of interaction and automation, the processes herein provide a user with a flexible approach to choose deeper levels and entry points (e.g., level 3) providing less automation and more detail as well as selection of other levels (e.g., level 1) when greater automation of best practices is desirable.

For example, level 1 service provider 104a may provide a beginner or most simplistic view of the data storage system and tasks performed for data storage configuration. Interaction with the level 1 service provider 104a requires the least amount of knowledge and may be geared toward interacting with users having minimal knowledge when performing a data storage configuration request by providing the greatest level of abstraction of the underlying system and operations performed. The language may be more non-technical in comparison to the interface language of other levels. As the level increases, so does the assumed level of knowledge of the user in connection with interactions. Level 3 service provider in the example 100 may be utilized by the most knowledgeable users providing a greatest granularity of control of all levels in connection with a data configuration request. Level 3 exposes more detailed information to the user than interactions at levels 1 and 2. As an example, a level 1 user may issue a data storage configuration request to provision storage for storing patient data of medical office application executing on one of the hosts. The level 1 user may specify a minimal amount of information in connection with the request such as only a number of patients for which storage is to be provisioned. A user may interface with the data storage system using a GUI and issue the data storage configuration request. The language and terminology of user interactions via the GUI may be customized for the level 1 user of the medical office application. In connection with the same medical office application, a more knowledgeable user may choose to issue a data storage configuration request via a GUI for a same number of patients by interacting with level 3 service 104c. At level 3, the user provides more detailed information about the request such as, for example, regarding the underlying data storage device and how this data storage device is used by the application. To further illustrate, the level 3 data storage configuration request may specify the physical and/or logical devices upon which storage is allocated, provide vendor-specific attributes or settings, indicate a number and type of file or records created, and the like. In connection with the type of file created, this may be particular to the medical office application. In connection with the user communicating with the level 1 service provider, such detail is not provided and defaults may be specified by the data storage system when implementing the level 1 data storage configuration request. The defaults may be customized for the particular application.

When implementing the request, the level 1 service provider may communicate with one or more other level service providers such as 104b and 104c. Different defaults for the particular application may be used by service providers 104b and 104c. For example with reference to the level 1 request for the email application described above, the level 1 service provider 104a may communicate with the level 2 service provider 104b. Provider 104b may then communicate with the level 3 service provider 104c to implement the request and allocate the requested storage along with specifying other defaults such as, for example, a default level of data protection. The service provider 104c may communicate with other data storage system hardware and/or software when implementing the configuration request.

As illustrated in the example 100, a service provider at a level n may generally communicate, directly or indirectly, with one or more other service providers at levels lower than level n when processing a data storage configuration request. A user may select the level of interaction and the user's data configuration request is received at the data storage system by the UI 102. The UI 102 in turn communicates with the appropriate level service provider to initiate the request. Furthermore, a request received at a first level can result in multiple requests to a lower level to perform an operation. For example, a user may connect to the data storage system 12 at level 1 104a. In response, the level 1 service provider 104a may issue more than one request to provider 104b. In turn, each request to provider 104b may result in one or more requests to provider 104c which, in turn, communicates with adapters and other code modules to perform the requested operation.

The data storage configuration request may identify the user (e.g., by user identifier or other authentication information), the application for which the request is being made, and any user selections or input parameters.

In one embodiment, the service providers 104a-104c may be code modules which are included in the same appliance. Each of the service providers 104a-104c may provide a published interface or API (application programming interface). A first service provider at level n may issue a request of another lower level service provider by issuing an API call to the lower level service provider. The API may also be used to facilitate communications between the UI 102 and the different level service providers of 110. As described in more detail in following paragraphs, an API call from a first service provider to a second service provide may use rules or mappings to map the data received by the first service provider to the appropriate API call with parameters and any defaults in accordance with the received data. Thus, the rules or mappings may be used to map between levels of abstractions of the different service providers.

Although an embodiment may have all service providers 110 located in the same appliance or other component, the service providers may be characterized as remotable. One or more of the service providers may be located on different components having connectivity so that the API calls between service providers may be remote API calls as well as local API calls (e.g., service providers on same component). As an example, an embodiment may have multiple data storage systems included in a network. Each of the service provider may be located on a different data storage system.

An embodiment may determine the level at which a user interacts with the system using a variety of different processes. With reference to FIG. 2, a user may be allowed to interact at any of the 3 levels. The menus may be directed to a level 1 user. The user may select whether to interact at a lower level by selecting further detailed menu options providing more detailed information at lower levels. As a variation, a user may have associated roles or permissions. If the user does not have the associated roles or permissions to perform operations or view such detailed information associated with particular levels, the associated menu options, wizards, and the like, may not be displayed or may otherwise be disabled when interacting with the particular user.

As a variation to the foregoing, the levels exposed to a user may be limited in that a user may not be allowed to interact with one or more lower levels. For example, user interaction with the data storage system may start at level 1 and provide wizard or other menu options for more detailed selection by the user for level 2. However, information and interactions at level 3 may never be exposed if the product is intended only for a certain level of users or a particular target market. In other words, the capability to drill down and interact may be limited to only levels 1 and 2 but not level 3.

An embodiment may also utilize user preferences to determine the initial or default level of interaction and exposure. For example, user preference settings stored on the data storage system or on the host may specify a default level used for the user interface menus, language, and the like. No further detailed buttons or drill down capabilities may be provided via the interface unless the user changes his/her preferences and selects to apply such preferences. In such an embodiment, the user interface may be presented from a viewpoint of the user preferences having content, structure and an interface language/terminology in accordance with the selected level. The user preferences may be stored as configurable parameters or options on the appliance or remotely located, such as on the host, and used by the appliance. For example, the configuration file for the users may be stored on the host. An agent on the host may read the configuration file and communicate the preferences to software on the appliance providing data for populating and presenting the user interface. A user may change the preferences via menu options, directly editing a configuration file, and the like. As a user gains experience and knowledge, a user may select to interact at a lower level for some or all requests.

Figure 3:
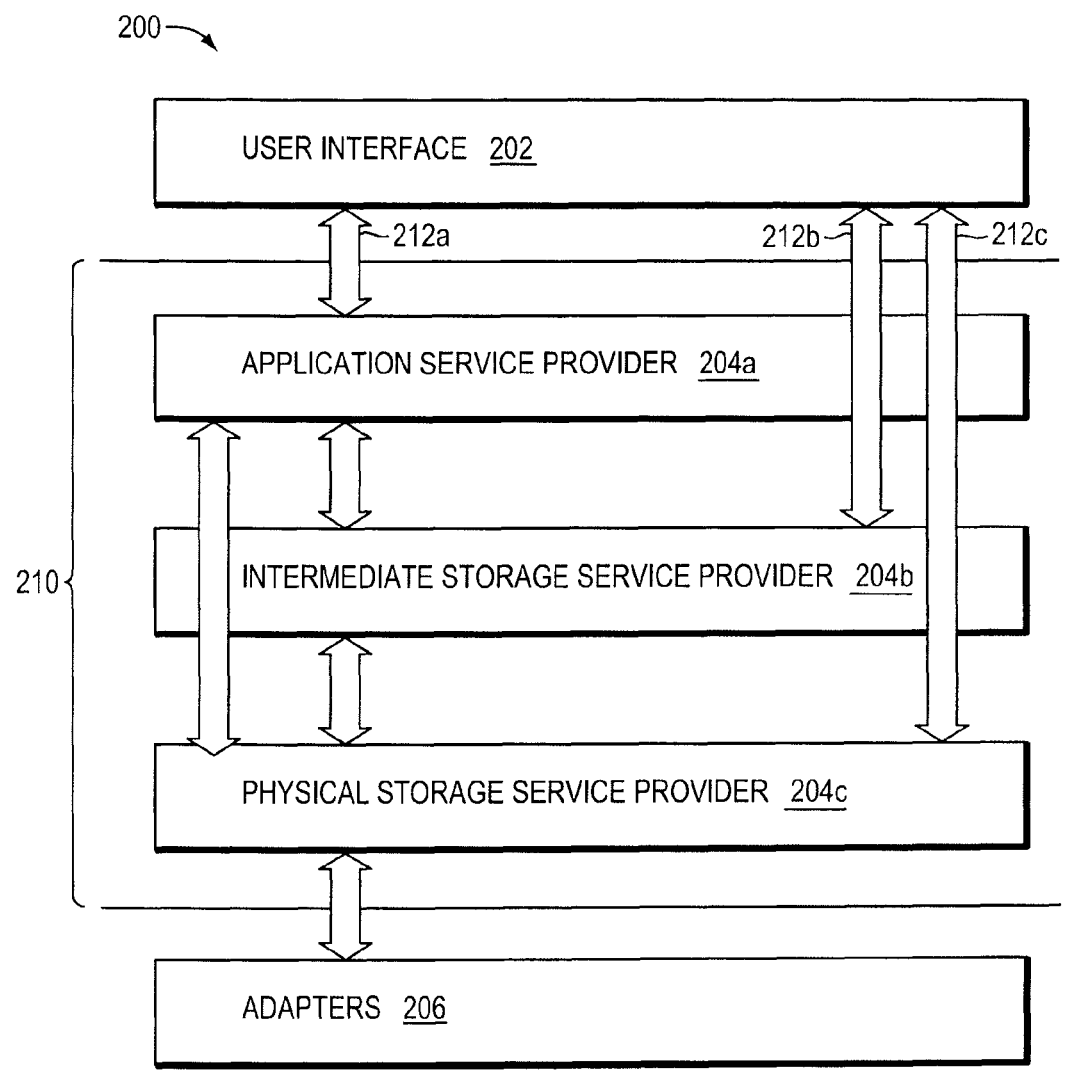

Referring to FIG. 3, shown is another example representation of components that may be included on the data storage system 12 for use in performing the processes herein for data storage configuration. The example 200 is a more detailed illustration setting forth a particular instance of the different service providers and levels that may be included in an embodiment. Elements 202 and 206 are similar, respectively, to elements 102 and 106. Element 210 includes 3 service providers: application service provider 204a, intermediate or generic storage service provider 204b and physical storage service provider 204c. With respect to a level hierarchy, 204a may correspond to level 1 service provider 104a of FIG. 2, 204b may correspond to level 2 service provider 104b of FIG. 2, and 204c may correspond to level 3 service provider 104c of FIG. 2.

The application service provider 204a may have an application-specific focus and provide a level of abstraction customized for an application such as, for example, a particular email application, law office application or medical office application, as well as a class of related applications, such as a multiple email applications. When interacting with provider 204a for a particular application, the interface language may vary with the application. For example, if the application is a law office application, the interface language, menu options, and the like, may be tailored to the law profession. Similarly, a medical office application may utilize an interface language, menu options, and the like, familiar to the medical office. As such, the application service provider 204a may use one set of rules or mappings for each application to implement the application specific best practices for the user level. A first set of rules for the medical office application may be used to map the user input parameters using medical office terminology to parameters for the appropriate API calls for other service providers 204b and/or 204c. A second set of rules for the law office application may be used to map the user input parameters using law office terminology to parameters for the appropriate API calls for other service providers 204b and/or 204c. The user connecting to the data storage system at the application service provider level 204a may be provided with a user interface customized for the selected level and application to perform a requested data storage configuration.

The intermediate storage service provider 204b may be an intermediate or second level of user interaction. As illustrated, the provider 204a may communicate with 204b when implementing a request for data storage configuration. In one embodiment, a user connecting to provider 204b may be provided with a generic level of interaction which may not be tailored for the particular application. In other words, the same language and user interface may be presented to a user for multiple applications such as the medical application or law office application. As a variation to the foregoing, the service provider 204b may be customized for each application and provide for a more detailed level of exposure that varies per application.

The physical storage service provider 204c provides the most detailed or greatest level of exposure of the underlying data storage system. The provider 204c may be customized for the particular storage vendor and associated options. The user interface for a user connected at level 3 to service provider 204c may include menu options and terms particular to the underlying storage vendor and the more knowledgeable user. For example, the user may specify particular devices, RAID levels and methods, file types, SCSI and iSCSI terminology, and the like.

The best practices and the automation of the best practices as described in more detail in following paragraphs may be customized for a particular application and the particular data storage system and environment. In other words, the best practices may vary in accordance with the particular application as well as the underlying data storage system and environment. For example, different practices may be preferred for a same application as the underlying data storage system changes. In such an instance, for example, there may be a first set of mappings used for mapping level 204a information to level 204b providing automation of best practices for a user connecting at level 204a for the application. The same first set of mappings may be used even if the data storage system differs. Other mapping rules may be used to map level 204b information to level 204c information in accordance with the best practices for the underlying data storage system. As the data storage system changes, the mappings used for level 204b-level 204c mapping may change although the same first set of mappings may be used.

Providing different levels of application-specific user interaction as described above, where each level may vary with the knowledge required to perform a data storage configuration operation such as a provisioning request for a particular application, is further described, for example, in U.S. Pat. No. 7,523,231, Apr. 21, 2009, Gupta et al. APPLICATION AWARE STORAGE (the '231 patent), which is incorporated by reference herein. The '231 patent describes use of different application-specific user interactions with file systems and/or block storage in order to provide varying levels of automation in accordance with different levels of user knowledge for provisioning. As such, the '231 patent describes an embodiment in which a user may be exposed to varying levels of detail regarding file systems and block storage device configuration, where the level of detail exposed varies with a selected level of user interaction and expected knowledge or skill. The foregoing processes may be further applied for use with provisioning storage for particular applications where data used by the applications may be stored as objects in an object-based storage system. In other words, a user may be exposed to varying levels of detail regarding options used with the object-based aspects or layer(s) of data storage in a manner similar to varying user exposure at varying levels to aspects of file system and/or underlying device configuration for block storage. This is described in more detail in following paragraphs and figures.

In an object-based storage environment, data may be stored as an object within a pool of objects. The object may be retrieved using an object identifier. An application referencing an object or performing an operation on an object (e.g., read, write, delete) may not specify a directory or device location for the object. Rather, the object may be referenced by the application using the object identifier, for example, to retrieve the previously stored content of the object. In one embodiment, the objects may be characterized as a flat, non-hierarchical pool where the object identifier allows retrieval of the object from the pool. As will be described in more detail, the object-based system may be implemented on top of one or more underlying technology layers such as a file system, block storage, and/or database. As such, the complexity of performing a data storage provisioning operation may further increase with object-based storage which may be implemented using one or more other technology layers (e.g., file system, block storage and/or a database).

An example of an object-based storage system is a content-addressable storage (CAS) system. In a CAS system, data or content of the object is stored using a content address generated based upon the contents of the data of the object itself. The content address may be generated by applying a hash function to the data to be stored. The content address may be mapped within the data storage system to one or more physical storage locations within the data storage system. More generally, CAS systems use processes where stored objects may be identified based on the content. However, the processes described herein may be used in other embodiments where an object identifier is determined in other ways rather than being based on the contents of the stored object itself. As such, although CAS is used to illustrate the processes herein, it should be noted that CAS is only one exemplary implementation of an object-based storage system that may be used with processes herein and the processes herein should not be construed as being limited for use with a CAS object-based embodiment.

CAS systems are further described, for example, in U.S. Pat. No. 6,807,632, Oct. 19, 2004, CONTENT ADDRESSABLE INFORMATION ENCAPSULATION, REPRESENTATION, AND TRANSFER, Carpentier et al.; U.S. Pat. No. 6,976,165, Dec. 13, 2005, SYSTEM AND METHOD FOR SECURE STORAGE, TRANSFER AND RETRIEVAL OF CONTENT ADDRESSABLE INFORMATION, Carpentier et al.; U.S. Pat. No. 7,398,391, Jul. 8, 2008, CONTENT ADDRESSABLE INFORMATION ENCAPSULATION, REPRESENTATION, AND TRANSFER, Carpentier et al.; and U.S. Pat. No. 7,415,731, Aug. 19, 2009, CONTENT ADDRESSABLE INFORMATION ENCAPSULATION, REPRESENTATION, AND TRANSFER, Carpentier et al., all of which are incorporated by reference herein. Additionally, CAS is an example of object-based storage system that may be implemented on top of (i.e., using) one or more underlying technologies. For example, U.S. Pat. No. 7,376,681, May 20, 2008 to Todd et al., METHODS AND APPARATUS FOR ACCESSING INFORMATION IN A HIERARCHICAL FILE SYSTEM, which is incorporated by reference herein, describes use of a software CAS layer implemented on top of file system(s) and block storage so that the contents are ultimately stored on a block I/O storage system.

Figure 4:
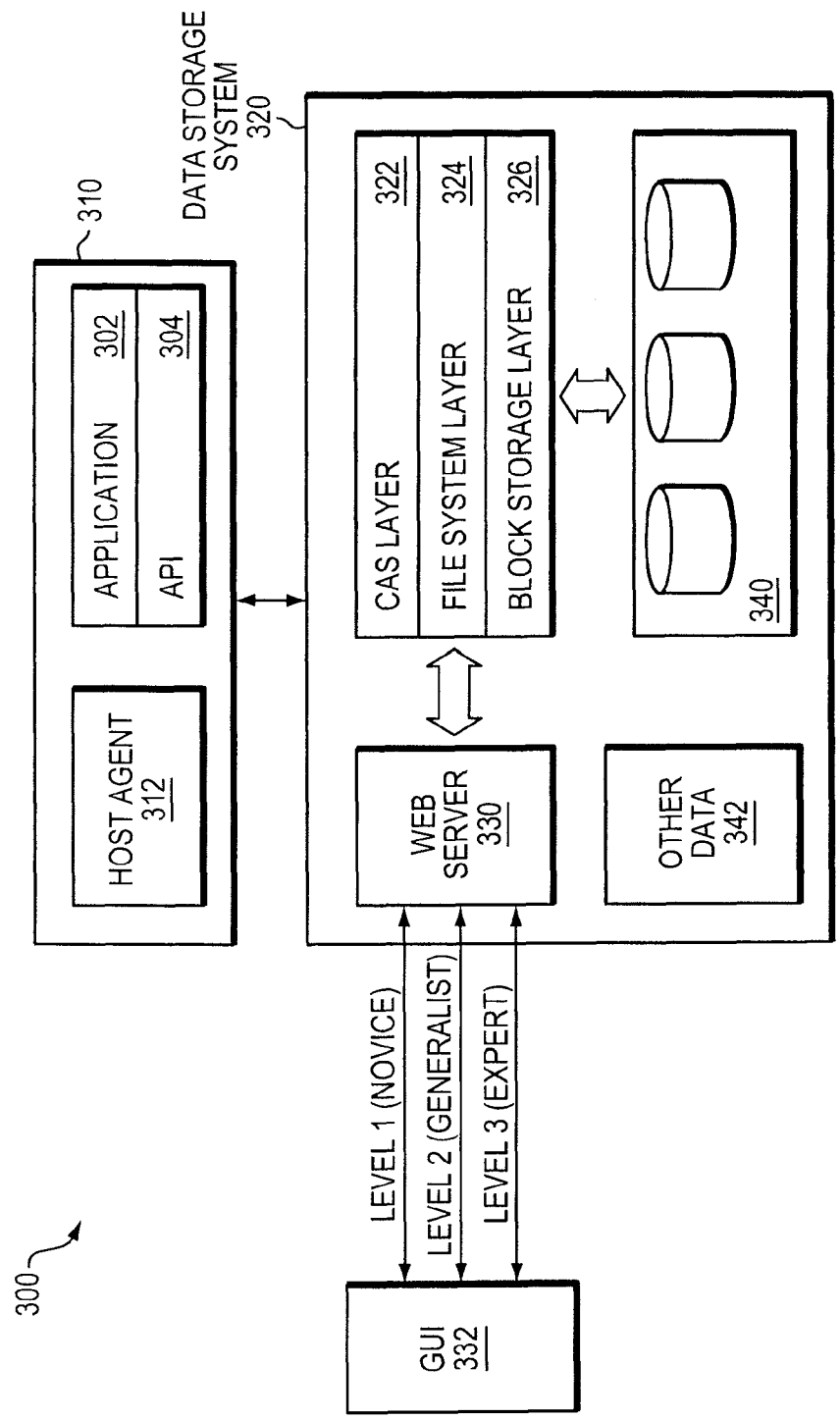
FIG. 4 is an example illustrating data flow and interaction between components of a system in accordance with techniques herein.

Referring to FIG. 4, shown is an example of an embodiment of a host communicating with a data storage system in accordance with techniques herein. The example 300 includes a host 310 and a data storage system 320. The host 310 may include one or more applications 302, an API (application programming interface) 304, and host agent 312. The data storage system 320 may include a web server 330, storage devices 340, and software executing thereon comprising CAS layer 322, file system layer 324 and block storage layer 326. GUI (graphical user interface) 332 may correspond to one type of UI represented by element 102 of FIG. 2 and element 202 of FIG. 3. The GUI 332 may provide functionality as described herein so that a user may interact with the data storage system 320 at any one of a plurality of levels when performing data storage management operations, such as storage provisioning requests. In the example 300, 3 levels (Novice, Generalist and Expert) are illustrated. In accordance with different levels of expertise or knowledge, each of the 3 user interaction levels may provide the user with different levels of automation and varying levels of exposure to details in connection with performing an operation such as for a storage provisioning request.

The GUI 332 may communicate with the web server 330 of the data storage system in connection with a request such as to provision storage for a particular application (e.g., application 302 of host 310). In turn, the web server 330 may communicate (directly and/or indirectly) with one or more other layers of software 322, 324 and 326 executing on the data storage system and with a host agent 312 in connection with performing the request, such as to provision storage for application 302. The web server 330 and/or other software executing on the data storage system 320 may also access other data 342 (e.g., application customization options, rules, and the like) in connection with performing processing described herein.

Application 302 executing on the host 310 may be, for example, an email application, a medical office application, a law office application, and the like. The application 302 may communicate with the data storage system 320 when issuing requests, such as to perform operations (e.g., read, write, modify) on application data stored as objects on the data storage system 320. In one embodiment as described below in more detail, data for an object may include the content and metadata describing the object such as in the form of object attributes (e.g., attribute name=value pairs). Examples of metadata may include a creation date or timestamp, object name specified as a character string, other string descriptors where a common string descriptor may be associated with and used to identify particular sets of objects (e.g., name of application or host associated with creating the object or last modifying the object, application version number, corporate division), and the like. The application 302 may communicate with the data storage system 320 using API 304. The API 304 may be, for example, code of a software development kit (SDK) for use when interfacing with CAS layer 322 to perform operations on the application data stored on devices 340. The host agent 312 may be software executing on the host 310. The host agent 312 may, for example, communicate with the GUI 332 in connection with configuring the host with authentication information used, for example, when the application 302 issues a request using API 304 to store data on the data storage system in accordance with an object-based storage system such as system 320 using CAS 322.

In connection with using CAS or another object-based storage system or layer, it should be noted that an embodiment may implement the CAS layer using one or more other software technologies than as illustrated in the example 300. The example 300 illustrates CAS 322 being implemented using file systems and block storage. However, CAS 322 may be implemented using other layers and associated technologies. For example, CAS 322 may be implemented on top of, or using, a database rather than a file system 324. The database may then use functionality represented by the block storage layer 326.

In one embodiment as will be described in more detail in following paragraphs, each of the 3 levels—denoted in FIG. 4 as Novice, Generalist and Expert—may provide a different level of automation and varying level of exposure to details, options and the like, associated with performing a requested application-specific operation, such as to provision storage for the application 302 on host 310. As described in the '231 patent, each of the 3 levels may provide varying levels of automation and exposure to details of the file system and block storage layers when implementing a request to provision storage. Additionally, as described in more detail below, each of the 3 levels may provide a corresponding level of automation and exposure to details of the CAS layer 322 when implementing a request to provision storage.

Prior to describing features of an object-based system that may be automated in accordance with application-specific best practices for storage provisioning and may be exposed in varying degrees in accordance with different levels of user interaction, details regarding a storage object that may be used with processes herein are set forth.

Figure 4A:
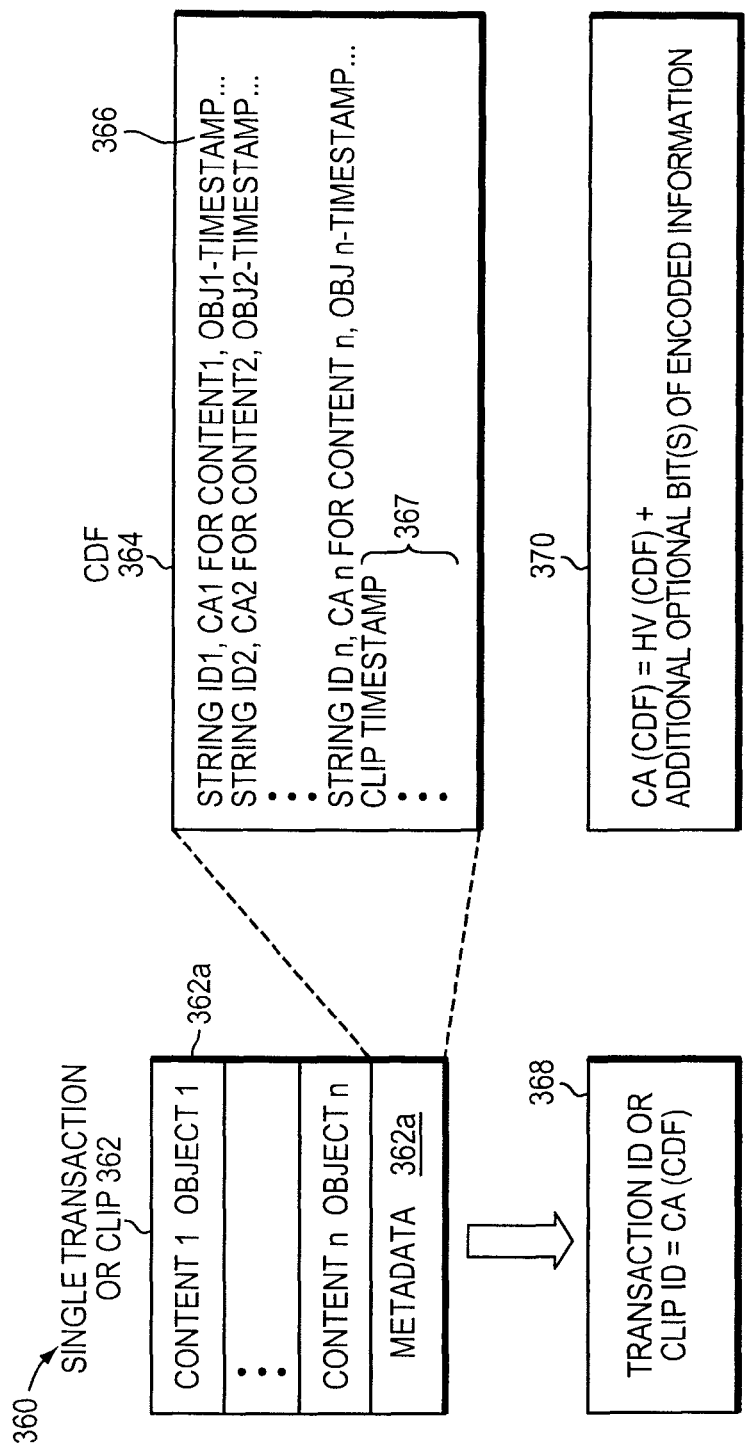
FIG. 4A is an example illustrating portions of content and metadata for objects in an embodiment in accordance with techniques herein.

Referring to FIG. 4A, shown is an example illustrating additional detail regarding objects as may be used in an embodiment in connection with processes herein. The example 360 illustrates a single transaction or clip 362 that may include contents for one or more objects and associated metadata 362a. The metadata 362a in one embodiment may be referred to as a content descriptor file (CDF) 364 and may include the metadata for the objects of the clip 362 as well as additional metadata that may characterize the entire transaction or clip 362. The CDF 364 is illustrated as including a line of metadata for each object of 362 and other clip or transaction metadata 367. To further illustrate, CDF 364 includes the object metadata 366 corresponding to object 1 362a. Object 1 metadata 366 may include a string ID1, a content address (CA) for content1 of object 1 (denoted CA1), a timestamp (denoted obj1-timestamp) indicating the time of object creation, and the like. String ID1 of 366 may be a character string used by the application to refer to object 1 by name. In one embodiment as described herein, each CA for an object, such as CA1, may be determined based on the contents of the object itself. The CA may be determined, for example, based on a hash value of the contents of the object. The CA may also optionally include one or more other encoded bits of information that may be used in determining the location of the object on the data storage system. Element 368 illustrates that the CA for the CDF 364 may be determined and used by an application as the transaction ID or clip ID. The application may use the clip ID in order to retrieve the contents or metadata for an object of the clip 362. Element 370 illustrates how a CA for the CDF may be determined based on the hash value of the CDF and, optionally, one or more other bits of encoded information for the clip.

With reference back to FIG. 4, the application 302 may write a clip including one or more objects to a virtual pool of the data storage system. Virtual pools are described in more detail elsewhere herein. In connection with the foregoing, the application 302 may transmit, using the API 304, the content for each object of the clip to the data storage system 320. In response, the data storage system 320 (e.g., such as software included in CAS layer 322) may return the CA for each object to the API 304. The API 304 may then form the CDF for the clip and transmit the CDF to the data storage system 320. The data storage system may determine the CA for the CDF and return the CA for the CDF to the API 304. The API 304 may return the CA for the CDF to the application 302 as the transaction or clip ID. The application 302 may use the clip ID to subsequently perform operations on an object of the clip. The metadata for each object may include the metadata specified by the API as well as other information determined and returned from the CAS layer 322. For example, as will be described below, a CAS-based implementation may include a feature which automatically generates metadata and includes such metadata into all objects written to a virtual pool. Using the automatic metadata generation feature, the CAS software layer 322 may update the metadata for an object to include the automatically generated metadata. Additionally, the API 304 of the host may also specify that particular metadata is included for an object (e.g., the string ID such as ID1, ID2, and the like). If software, such as the CAS layer 322, of the data storage system auto-populates (such as through the automatic metadata generation described elsewhere herein in more detail) portions of an object's metadata, an embodiment may have the data storage system return such metadata to the API 304 for inclusion in the CDF produced by the API 304. Alternatively, an embodiment may have the CAS layer 322 receive a first version of the CDF from the API 304, may then generate an updated CDF, determine the CA for the updated CDF, and then return the CA for the updated CDF along with the updated CDF to the API 304 of the host. Furthermore, it should be noted that an embodiment may have the API 304 perform additional processing as part of detection of data transmission errors and/or data integrity. For example, an embodiment may have the API 304 determine a CA for each object contents while the API 304 streams the content to the data storage system. The API 304 may then perform an additional step of checking to see whether a first CA, as returned by the data storage system, matches the calculated CA, as determined by the API. If not, the API 304 may determination that there may have been an error in data transmission of the object contents, notify the data storage system of such determination, and then retransmit the object contents believed to be the subject of the erroneous data transmission.

What will now be described are features that may be included in an embodiment of an object-based system, such as an embodiment utilizing the CAS layer 322. Functionality associated with those features may be exposed to a user in varying levels of detail and may also be implemented with varying levels of automation in accordance with application-specific best practices. The varying levels of detail and automation may be in accordance with expected levels of knowledge of a user issuing a request, such as from GUI 332, to provision storage. An embodiment may include additional functionality and features than as described herein as provided by the CAS layer 332 or other object-based system. Features of the CAS layer 332 that may be exposed in varying levels of detail and associated with varying degrees of automated application-specific best practices relate to virtual storage pool configuration, retention classes, automatic metadata generation, and application profiles (or p-files). These features are described in more detail below.

When configuring and provisioning object-based storage for use with an application, the application may be allowed to perform data storage operations on objects included in one or more virtual object pools. As such, a virtual pool may be configured for use with an application as part of processing a request to provision storage for the application. As mentioned above, a virtual pool or virtual object pool may correspond to a logical segregation or partitioning of the object space. An embodiment may allow particular applications access to one or more specific virtual pools containing data for the particular applications. For example, for security and compliance reasons, a medical application may not be allowed to access financial information used by a mortgage application, and vice versa. Furthermore, for a given virtual pool, different types of access and operations may be allowed for a specified application. Thus, part of virtual pool configuration may include specifying attributes related to what application(s) on what host(s) are allowed access to one or more specified virtual pool and also what types of access (e.g., read-only, read existing objects and write new objects, modification to existing object attributes) are permitted. For example, a first virtual pool may contain general information used by both the medical and mortgage applications and both such applications may only be allowed read access to objects included in the first virtual pool. A second virtual pool may contain data used only by the medical application and the medical application is allowed to read and write new objects to the second virtual pool. A third virtual pool may contain data used only by the mortgage application and the mortgage application is allowed to read and write new objects to the third virtual pool. Thus, virtual pools may be used to facilitate data security and compliance. Additionally, having different application(s) access specified virtual pools may be used in connection with performing capacity analysis (e.g., how much storage is being used by the medical application, email application, and the like). To this end, objects written to a particular virtual pool may have their metadata field automatically populated with information identifying the particular application, host writing the data, corporate division or hospital owning the particular application storing the object, and the like. Automatic metadata generation is described in more detail elsewhere herein. Capacity analysis may be useful in connection with determining storage charges and may be tracked by determining, for example, which objects have corresponding metadata identifying particular storage consumers (e.g., applications, hospitals, and the like).

Although virtual object pools may be implemented independent of, and using any desired, underlying physical storage devices and technologies, additionally processing is performed to configure the underlying storage devices for use in storing objects. In other words, virtual pool configuration may also include performing processing required to establish, allocate, or set up the storage of the virtual pool for consumption by the application. Such processing may include selecting various options associated with the lower layers of the file system, block storage, and the like, upon which the object-based storage is implemented, creating one or more file systems, configuring one or more storage devices to have a desired RAID level of protection, and the like. In one embodiment, selection of file system options and block storage options, as well as configuring any RAID groups, creating file systems, and the like, may be performed in an automated fashion in accordance with best practices for the particular application using the virtual pool. Thus, one embodiment may not expose details regarding the file system layer 324 and block storage layer 326 when a user issues a request to configure storage for an application. Rather, in this embodiment, only details of the CAS layer 322 and functionality related to objects may be exposed to the user and automated in varying levels. In another embodiment, the different levels of user interaction and associated skill may expose varying levels of detail of the CAS layer 322 and, optionally, one or more other lower layers (such as of the file system layer 324 and/or block storage layer 326). Examples of different levels of user interaction and detail as related to layer 324 and 326 are provided in the '231 patent.

Figure 5:
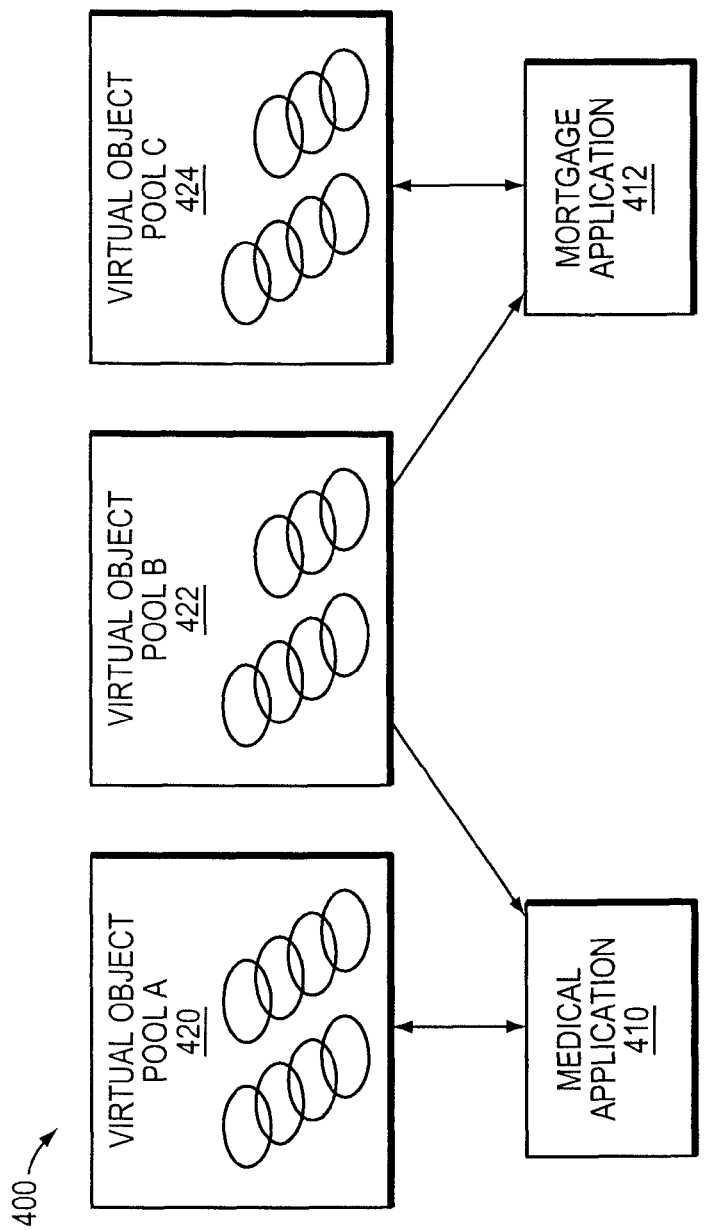
FIGS. 5 and 6 are examples illustrating use of virtual pools.

Referring to FIG. 5, shown is an example illustrating virtual object pools as may be used in an embodiment described herein. The example 400 illustrates object space comprising 3 virtual pools 420, 422 and 424. The medical application 410 may have access to pools 420 and 422 and the mortgage application may have access to pools 422 and 424. Pool 422 may represent the common or shared data of the applications 410 and 412. Pool 420 may represent data accessible only to the medical application 410. Pool 424 may represent data accessible only to the mortgage application 412. The example 400 illustrates segregating virtual pools based on application usage. However, as will be appreciated by those of ordinary skill in the art, the logical partitioning of object space into one or more virtual pools may be performed based on the foregoing and/or other criteria.

Figure 6:
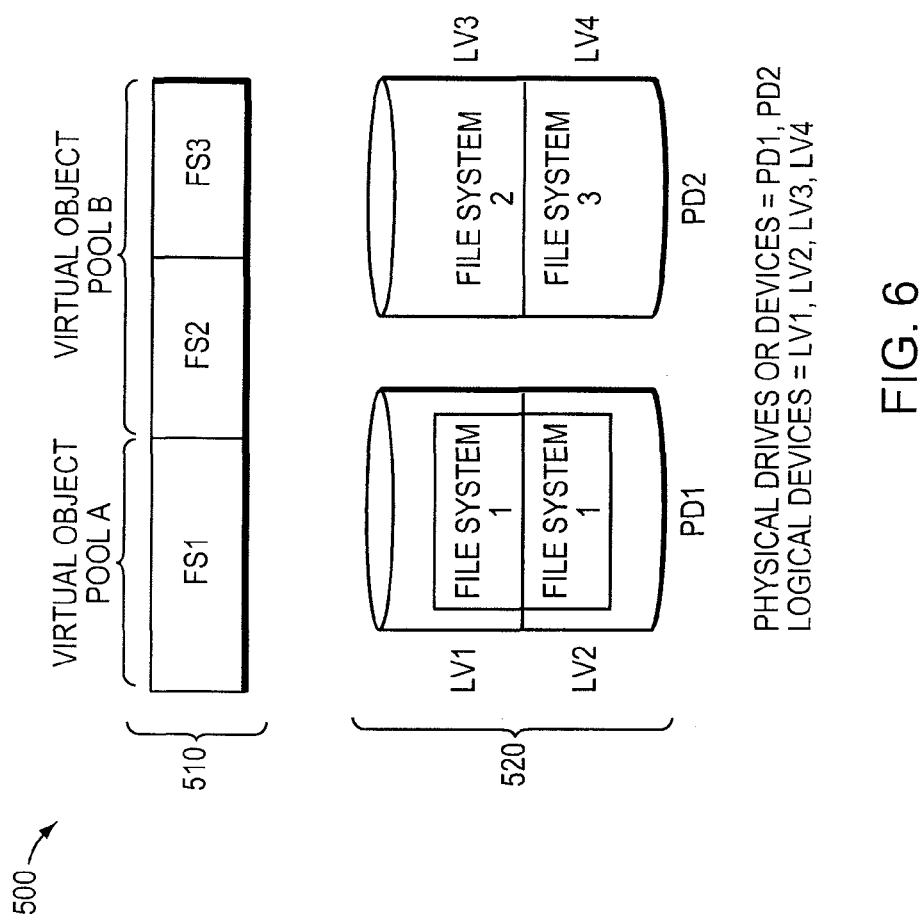

Referring to FIG. 6, shown is an example illustrating how virtual object pools may be configured in an embodiment in accordance with processes herein. The example 500 illustrates an embodiment in which virtual pool A and virtual pool B are implemented using file systems and block storage layers as described elsewhere herein. Element 510 indicates that virtual object pool A consists of a single file system, FS1 and that virtual object pool B consists of two file systems, FS2 and FS3. As illustrated in FIG. 5, virtual pool A may be used by only the medical application and may be configured using a single file system of a type selected in accordance with the medical application best data storage practices. For example, if the medical application typically has large files over a particular size and the data is typically accessed infrequently (e.g., no more than once every year or other specified time period), the file system FS1 may be of a type particularly suitable for operating on files of at least the particular size and which is accessed infrequently. As also illustrated in FIG. 5, virtual pool B may be used by both the medical application and mortgage application and may be configured using two file systems of a same type or of different types selected in accordance with the best data storage practices for the data typically expected to be stored therein. For example, if the common or shared data stored in virtual object pool B is frequently accessed and typically includes a large number of small files under a particular size, the file systems FS2 and FS3 may be of a type particularly suitable for operating on such files.

Element 520 illustrates the physical and logical devices upon which the storage for the virtual object pools A and B resides. The particular physical devices (PDs) selected may vary with device characteristics also based on expected usage for application-specific best practices. For example, PD2 may be considered a "fast" device having physical device attributes to facilitate quick response times. Similarly, different physical devices may be configured to have a required level of RAID protection in compliance with law, rules and regulations for different types of application data.

Different aspects of the virtual pool configuration may be exposed and automated for different corresponding levels of user interaction. For example, a novice user may not be exposed to any aspect of virtual pools. A novice or first level user may make a menu selection to configure storage for a specified application. In response, the data storage system may automatically name and configure the virtual pool in accordance with application-specific best practices. As described above, such configuration may include selection of particular physical devices (e.g., based on device attributes), configuring such physical devices to have particular RAID protection, selecting a file system type and creating the file system on the configured physical devices, and the like. A generalist or second level user may be exposed to some aspects of virtual pools. In addition to those options that may be specified by the novice, the generalist may also provide a name for the virtual pool, a size "hint" indicating a typical or average size for each object of the pool, and may indicate an expected level of usage of stored objects (e.g., how frequently the object is expected to be referenced or retrieved). The size hint and/or expected frequency of use of data stored in the pool may be used by the data storage system, for example, in selecting an appropriate file system, selecting an appropriate physical device based on physical device characteristics, and the like. In addition to those options that may be specified by the generalist, an expert or third level user may also specify the particular file system type to use, a number of file systems to create, what physical devices to configure, and the like. With the expert level, the data storage system may use the information provided by the user (e.g., selected physical device, file system type and number, and the like) to override any information that may be specified in accordance with application-specific best practices. Greater levels of expertise and specifying additional details from the user may result in reduced levels of automation. Thus, as illustrated by the foregoing, a user having a particular level of knowledge may accordingly be allowed to specify different information affecting the degree of automation for virtual pools in accordance with best practices as performed by the data storage system.

A retention class may be defined specifying an amount of time that an object is to be retained (e.g., an amount of time that object deletion is disallowed). An object may have one or more attributes and one such attribute may identify a retention class. Object attributes, including specification of a particular retention class, may be provided when a new object is created. Also, an existing object may be modified to specify a selected retention class attribute or modify an existing retention class attribute. A user may be allowed to define a new retention class where the class definition indicates a particular retention time. A user may also be allowed to modify an existing definition for a defined retention class. For example, a first retention class may be defined specifying a 7 year retention time in accordance with existing laws and regulations at a first point in time related to how long a medical office is required to retain patient medical records and data. At a second point in time, there may be a law change so that the required retention time is now 10 years. As such, a user may be allowed to modify the retention time for the first retention class and all existing and new objects having the first retention class attribute may automatically have an updated retention time from 7 to 10 years. The particular operations with respect to retention classes which a user is allowed to perform may vary with the level of user interaction. For example, a level 1 Novice user may have no exposure to retention classes. A novice user may not be allowed to define or modify retention classes. Rather, when provisioning storage for an application, a default retention class may be automatically created for the application. Furthermore, in connection with the automatic metadata feature described below, the data storage system may use a default rule causing any objects subsequently written by the application into a particular virtual pool to be automatically tagged with the default retention class attribute. In connection with the novice user provisioning storage for the application, the data storage system may provide for automatic creation of the default retention class and automatic specification of the retention class as an attribute for all objects created in a particular virtual pool. The foregoing may be automatically performed in accordance with application-specific best practices so that, for example, data used by a first application may be retained for a first time period and data used by a second application may be retained for a second different time period. As part of enforcing retention time periods for objects, an embodiment may use other metadata, such as object creation date, to determine the ending date/time after which an object may be deleted (e.g., ending date/time=creation date/time+required retention time).

Retention classes, associating retention classes and retention times with individual objects or units of data, as well as modifications to retention classes and specified retention periods for objects are described, for example in U.S. Pat. No. 7,249,251, Jul. 24, 2007, Todd et al., METHODS AND APPARATUS FOR SECURE MODIFICATION OF A RETENTION PERIOD FOR DATA IN A STORAGE SYSTEM, which is incorporated by reference herein.

Figure 7:
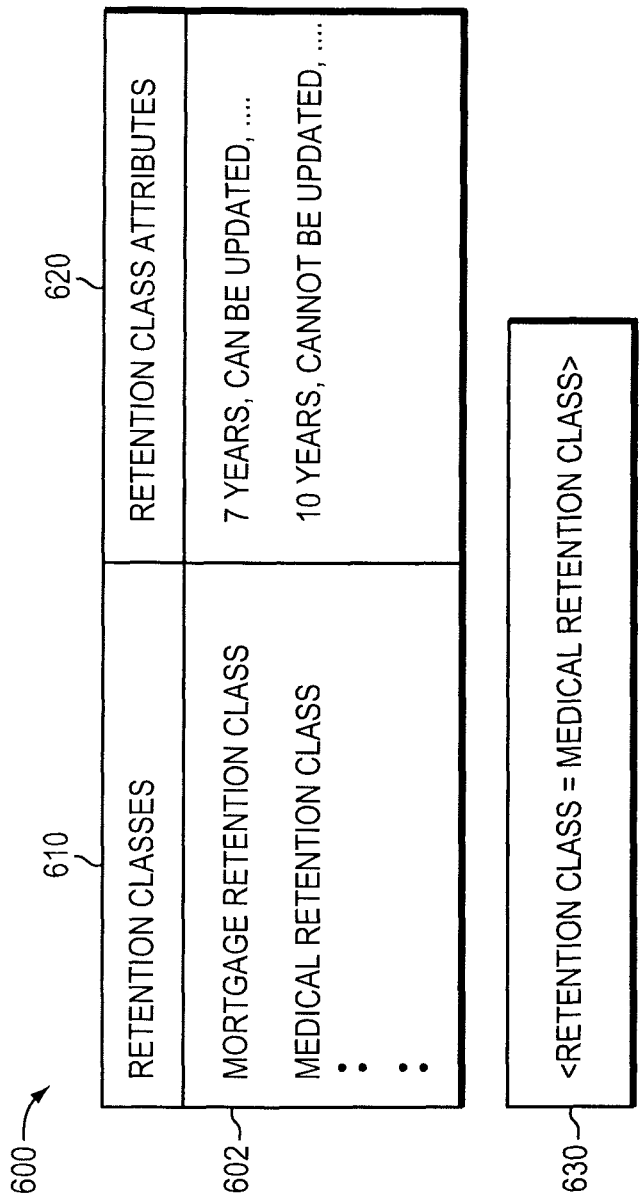
FIG. 7 is an example illustrating retention classes.

Referring to FIG. 7, shown is an example illustrating retention classes as may be used in an embodiment in accordance with processes herein. The example 600 includes a table 602 of retention classes with a first column 610 naming the defined retention classes and a second column 620 listing the attributes for the defined retention classes. Each line of the table 602 indicates the attributes in 620 which are associated with the named retention class in 610. For example, the mortgage retention class has a retention time of 7 years and the attributes of the mortgage retention class may be updated, for example, to modify the retention time from 7 years to 10 years at a later point in time in connection with a change to a rule, law or regulation. The medical retention class has a retention time of 10 years and the attributes of the medical retention class cannot be updated. The foregoing illustrates that, at the time of creation, a retention class definition may be specified with an attribute indicating whether the retention class definition may be updated at a later point time, or not. In those retention classes that are modifiable, a change to the retention class definition may provide for updating each object having the retention class as an object attribute. The foregoing may prove useful, for example, as an alternative to updating each object individually (e.g., if the object includes an attribute with the retention time specified as an absolute value rather than referencing the retention class as an attribute). Element 630 represents metadata associated with an object. Element 630 illustrates using "name=value" pairs to specify a retention class as an object attribute included in the metadata for the object.

For a particular application writing objects to a virtual pool, an embodiment may provide for automatic metadata generation. In connection with this feature, the data storage system may automatically populate an object's metadata with one or more items of information when the object is initially created and stored in the virtual pool. For example, in connection with provisioning storage for an application, a virtual pool may be configured. Additionally, the data storage system may also be instructed to automatically populate, via default settings and/or application-specific customizations, all objects stored in the virtual pool with one or more items of metadata. To further illustrate, a request may be made using the GUI of FIG. 4 to provision storage for a medical application on host 310. Processing of this request may include configuration of a virtual pool VP1. Additionally, settings for VP1 may be stored on the data storage system where the settings are used when subsequently creating and storing objects in VP1. The settings may include default automatic metadata generation settings provided by the data storage system in accordance with application-specific best practices. As an example, the data storage system may automatically populate each object's metadata with the name and version identifier of the application creating an object. Such information about the application may be included in the request to store or write the object to VP1. The settings may also include customized automatic metadata generation settings as may vary with the level of user interaction with the data storage system. For example, a novice user may not be allowed to customize automatic metadata generation and specify what metadata is automatically included for objects stored in VP1. However, a generalist or expert level user issuing a provision request for the application may specify that one or more additional items of metadata information are included in each object stored in VP1. Thus, the options and settings for automatic metadata generation may be specified in connection with a storage provisioning request and affect the metadata stored with an object and/or transaction in connection with subsequent requests by the application to store an object to VP1. Whether to allow a user issuing a provisioning request to specify automatic metadata generation settings may vary with the level of skill associated with a user interaction level (e.g., novice, generalist, expert). For those one or more levels associated with minimal skill or knowledge, the user may not be provided with the opportunity to modify default automatic metadata generation settings. In one embodiment, the automatic metadata generation may be specified for a particular application and one or more virtual classes used by the application. The automatic metadata generation may be specified for one or more virtual pools used by the application so that when the application stores an object in one of the designated virtual pools, the object metadata is automatically populated to include the specified metadata.

With reference again back to FIG. 4, when the application 302 makes a request to perform an operation with respect to a virtual pool of the data storage system, the API 304 may provide authentication or security-related information. The authentication information for the application may be included in an application profile or p-file stored on the host 310 upon which the application executes (e.g., the host from which the request is issued to the data storage system). The application profile may be created as part of the processing performed in response to the data storage system receiving a storage provision request for the application and the application profile may then be automatically transmitted to the host agent 312. In one embodiment, the GUI 332 or data storage system 320 may create the application profile. The application profile may specify, for example, which application on which host is allowed to access one or more named virtual pools, what operations (e.g., read only, read and write, delete, and the like) can an application perform with respect to one or more named virtual pools. At a later point in time after provisioning is completed and an application makes a request to store data in the provisioned storage, the application provides the profile to the data storage system along with the request. The data storage system then determines whether the request is allowable in accordance with the security information of the application profile. The application profile may be generated automatically in accordance with application-specific best practices as part of processing performed when provisioning storage. Additionally, as may vary with the interaction level (e.g., novice, expert, etc.), a user of the GUI issuing a provisioning request may or may not be allowed to specify input which is used in connection with generating the application profile. For example, in connection with the novice user, the application profile may be automatically generated without exposing the user to any details other than the particular host that the application is to run on. In contrast, for a user interacting with the GUI at an expert level, the user may specify additional application profile information such as the types of access that an application is allowed for one or more virtual pools. It should be noted that such information as described relates to virtual pools but also may affect the generated application profile.

Figure 8:
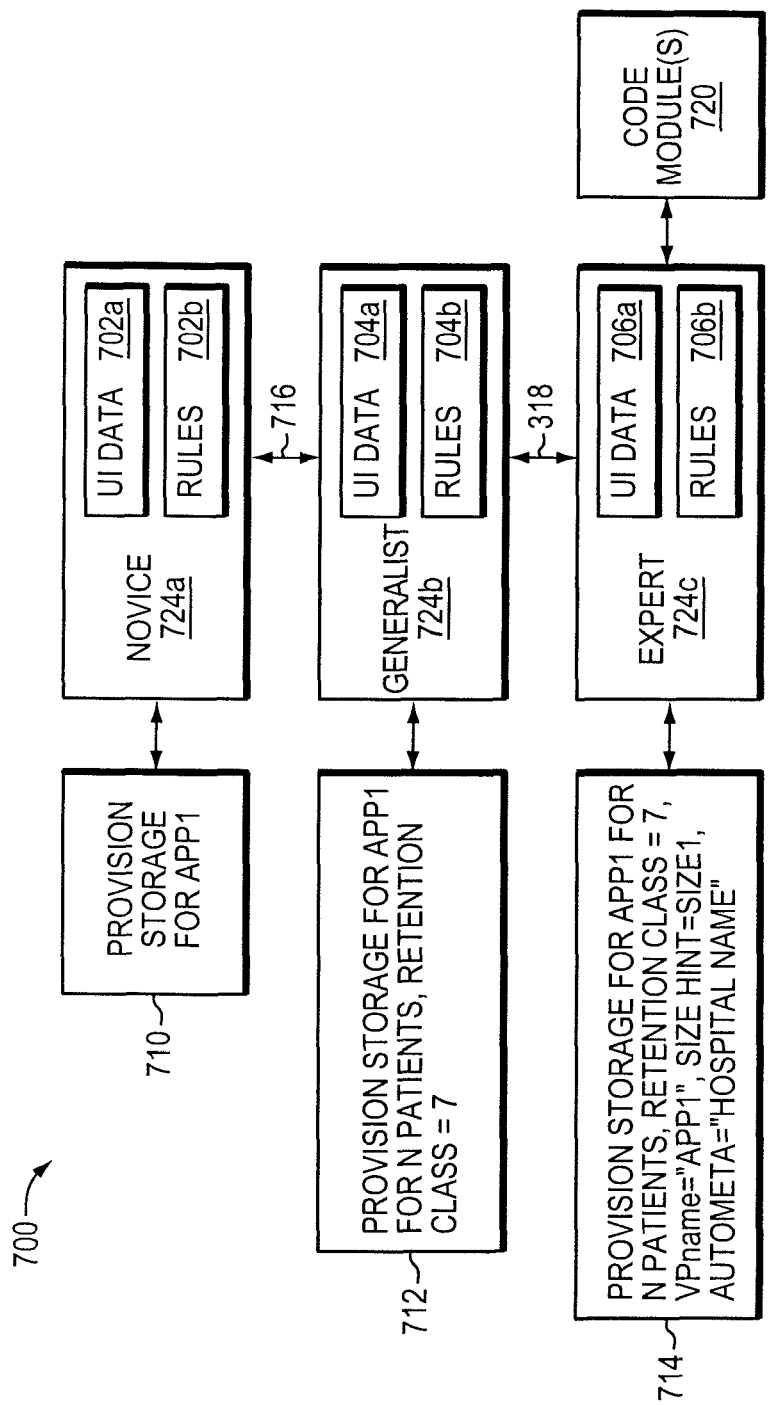
FIGS. 8, 9, 10 and 11 are examples further illustrating use of rules, mappings and different levels of user interaction in accordance with techniques herein.

Referring to FIG. 8, shown is an example illustrating how the different service providers of the data storage system may be used to perform the mapping between levels to perform a data configuration request, and also provide different levels of user interaction.

Elements 724a, 724b, and 724c correspond to the different levels of service providers such as described, for example, in connection with FIGS. 2, 3, and 4. Elements 710, 712 and 714 represent the information obtained via the GUI at the various levels and service providers. Element 710 represents the information obtained for a user connected at level 1 to service provider 724a. Element 712 represents the information obtained for a user connected at level 2 to service provider 724b. Element 714 represents the information obtained for a user connected at level 3 to service provider 724c. Generally, information obtained by a user at level "n" may be subsequently passed on via an API call to one or more other lower level (e.g. greater than "n") service providers in order to perform the user request.

Element 712 may also represent the information communicated by the service provider 724a after the provider 724a applies mapping rules 702b to 710 resulting in an API call of the form as illustrated in 712. Element 714 may represent the information communicated by the service provider 724b after the service provider 724b applies mapping rules 704b to 712 resulting in an API call of the form as in 714

With reference to the example 700, if a user interacts with the system at level 1, the novice service provider 724a obtains the data included in 710 which is passed in form 712 to provider 724b as illustrated by 716. Provider 724b in turn maps data from form 712 to the form 714 as communicated to provider 724c as illustrated by 318. If a user interacts with the system at level 2, the generalist service provider 724b obtains the data included in 712 and passes the data of 712 to provider 724c in the form represented in 714. If a user interacts with the system at level 3, the expert storage service provider 724c obtains the data from the GUI in the form 714. In this example, the provider 724c may implement or execute the one or more operations to perform the request indicated by 714 by invoking one or more other code modules 720. The code modules 720 may communicate with other components on the data storage system (e.g., such as those of other file system and/or block storage layers) to perform the requested task.

In one embodiment, the GUI of FIG. 4 may query each service provider of the data storage system to obtain the appropriate UI data 702a, 704a and 706a via API calls in accordance with a user selected level of interaction using any one of a variety of different processes as described herein and known to those skilled in the art. The UI data 702a, 704a and 706a may be used to populate the menus and other UI elements that may be displayed to a user.

The example 700 illustrates exemplary user inputs for provisioning storage for a medical application "app1" with interactions at the various levels 1-3 (novice, generalist and expert). Element 710 illustrates the input received from the most basic user level 1, novice, in which the user may enter or select via a menu option a command to provision storage for a selected application. The storage provisioned for medical application app1 with user level 1 interactions uses all default options specified via mapping rules and API calls to levels 2 and 3. For level 2, the parameters input from the user or received via mapping and an API call from level 1 are illustrated in 712. By default, parameters related to a number of patients (e.g., N patients) and retention class (e.g., retention class=7) are specified. For expert level 3, the parameters input from the user or received via mapping and an API call from level 2 are illustrated in 714. At level 3, additional details regarding the provisioning request and the underlying features of the CAS system, such as related to virtual pools and automatic metadata generation, are specified. In the example 700, the generalist at level 2 may have knowledge about retention classes but may not have knowledge regarding the virtual pool and automatic metadata features as exposed at the expert level.

In connection with the bottom most level service provider 724c or service provider associated with the greatest level of user knowledge and detail, 724c may optionally not include and utilize rules 706b. An embodiment may have the language of the user interface map directly with low level calls to code modules to implement the request. In other words, the language terms and parameter values specified by the user at expert level 3 may not require mapping in order to be utilized by the system.

As will be appreciated by those skilled in the art, the examples provided herein may be simplistic for purposes of illustration of the processes herein. An embodiment may need greater amounts of detail and complexity in order to provide automation of the best practices.

Figure 9:
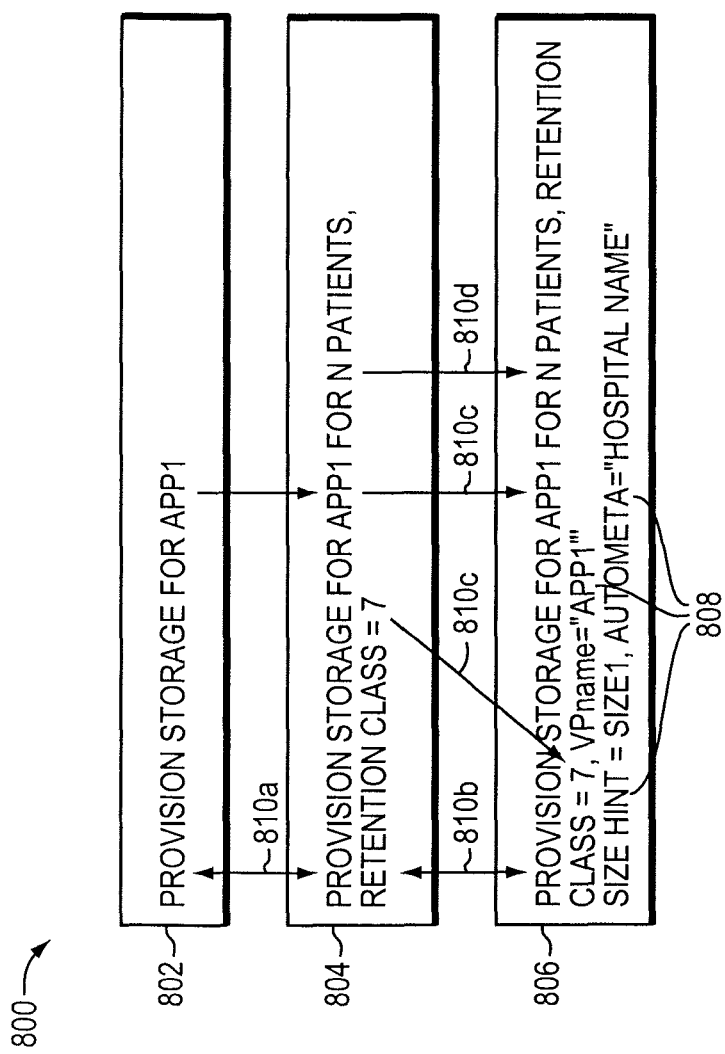

Referring to FIG. 9, shown is another representation of the mapping of the different parameters that may be performed by the rules of the different service providers. The example 800 further illustrates the parameter mapping between levels. Element 802 represents the data obtained by service provider 724a. Element 804 represents the data obtained by service provider 724b via direct user interaction or from provider 724a. Element 806 represents the data obtained by service provider 724c via direct user interaction or from provider 724b. The application name APP1 may be passed 810a as a parameter from level 1 to level 2, and then passed to level 3 810b. Novice Level 1 mapping rules may define defaults based on best practices for the particular application APP1 as indicated by the following parameters: N patients (specifying a default number of patients for which storage is provisioned) and retention class=7 (specifying a default retention class indicating a retention time period of 7 years). Generalist level 2 mapping rules may map the parameters of 804 to parameters of 806 as indicated by 810c, 810d, and 810e. Additionally, generalist level 2 mapping rules may introduce additional default parameter values as indicated by element 808 when interacting with level 3.

A generalist level 2 user may input the number of patients N and the retention class. Otherwise, if a user is interacting at the novice level, rules for mapping novice to generalist level may be used to specify defaults for the number of patients and the retention class.

With reference to 808, the parameter VPname="APP1" may specify the name of a virtual pool created for use with storing objects for APP1. The parameter SIZE HINT=SIZE 1 may specify the expected typical or average size, SIZE1, of an object for a patient. The data storage system may use the foregoing size indicator as a hint in connection with determining an amount of storage that may be allocated for the virtual pool in connection with the N patients parameter. The parameter autometa="HOSPITAL NAME" specifies that all objects subsequently stored in this virtual pool by the application will be automatically populated with object metadata denoting the hospital represented by "HOSPITAL NAME". An expert level 3 user may input the information represented by 808 (e.g., three items to specify the name of the virtual pool, the size hint, and the hospital name) as well as the parameter information for the number of patients N and the retention class (=7). Otherwise, if a user is interacting at the novice or generalist level, rules for mapping generalist to expert level may be used to specify defaults for items indicated by 808 with the remaining items of 806 being passed down from other levels.

As described herein, the user can connect and interact with the data storage system at various levels to perform data provisioning requests. The user may select the level of interaction that can vary with each request. The mapping rules provide for specifying any defaults that may be needed to implement the request. When implementing a same data provisioning request for different applications, the defaults introduced at one or more levels may vary with application. The mapping rules at the different levels allow for implementation of best practices while insulating and abstracting the details from the user. As such, using the processes herein, a framework may be defined which provides customized interfaces for different user levels of interaction with respect to a particular application when performing data storage provisioning and related operations for the particular application. Rules included in the framework may be selected for use depending on the application and user level of interaction. Rule processing, selection, and the like, as described in the '231 patent may also be used in a similar manner in connection with rules described herein.

Figure 10:
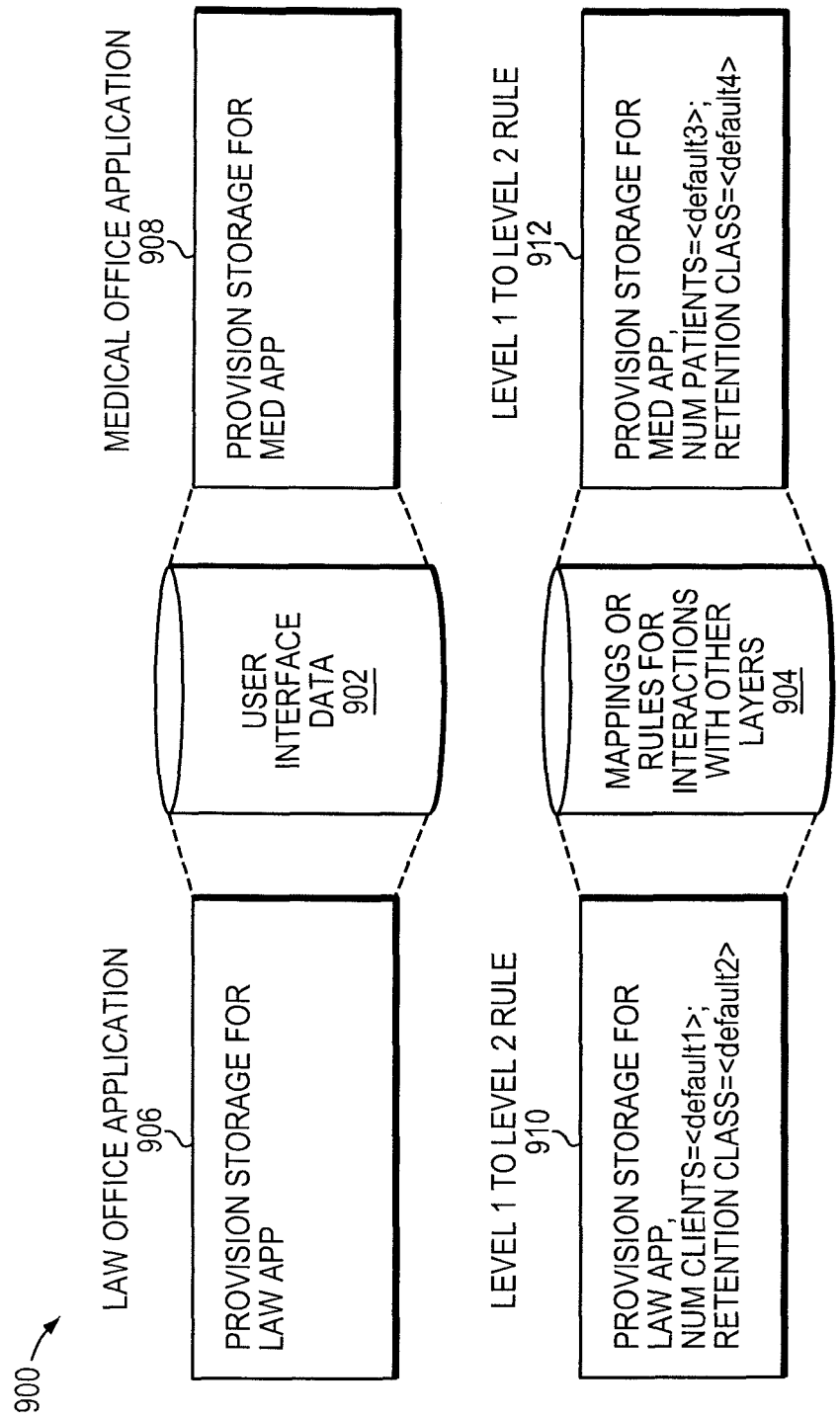

Referring to FIG. 10, shown is an illustration in more detail of rules that may be used in connection with a medical office application and a law office application. As described above, different mappings and rules may be used for each of the two applications in connection with implementing storage provision requests for each application. Additionally, the user interface language terms presented to a user at one or more levels may also vary with the application. For example, the medical office application and the law office application may each have a different set of terms for the UI language at novice level 1. A user may provision storage for both applications but the customers of each application may be in the different market segments, each market segment using different terminology. For example, a medical office may refer to a customer as a patient and the law office refers to its customer as a client and the user interface data 902 presented to a user (such as at the novice and other levels) may reflect this difference in terminology.

The example 900 includes user interface data 902 in connection with a provisioning request to provision storage for the law office application 906 and the medical office application 908. The elements 906 and 908 may each represent the user input with a provisioning request from the novice level. As illustrated, both are requests to provision storage but for different applications. Element 904 (e.g., a data store or container of rules) may include rules 910 and 912. Rule 910 is used for the level 1 to level 2 mapping for the law office application. Rule 912 is used for the level 1 to level 2 mapping for the medical office application. In connection with the request 906 to provision storage for the law application, LAW APP defaults are specified by the data storage system rule set including 910 so that the storage provisioned is based on a number of clients indicated by default1 and the objects stored will have a retention class indicated by default2. In connection with the request 908 to provision storage for the medical application MED APP, defaults are specified by the data storage system rule set including 912 so that the storage provisioned is based on a number of patients indicated by default3 and the objects stored will have a retention class indicated by default4.

Figure 11:
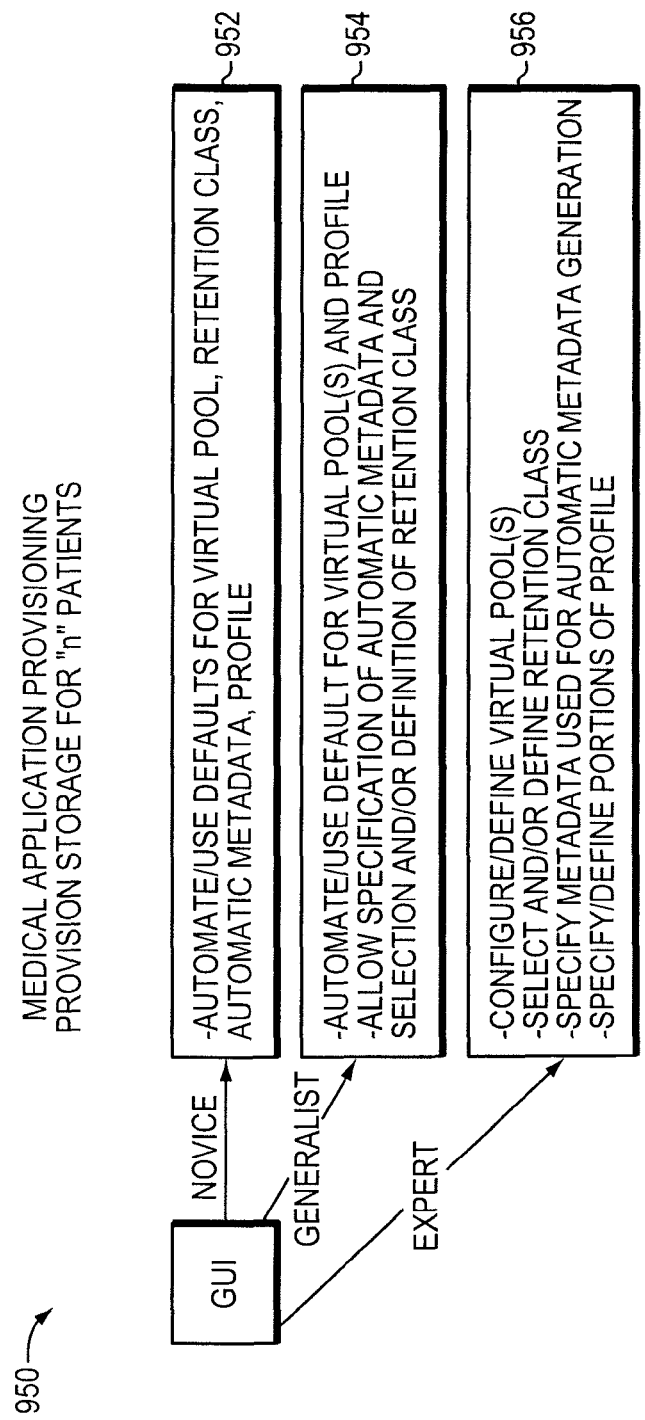

Referring to FIG. 11, shown is an example representing the object-based features and varying degree of automation and exposure in accordance with different levels of user interaction. The example 950 illustrates that users issuing provisioning requests when interacting with the data storage system at different interaction levels may be exposed to corresponding varying levels of detail regarding the CAS or object-based features of virtual pools, retention classes, automatic metadata generation, and application profiles. The example 950 summarizes one way in which varying degrees of automation and exposure to the foregoing features may be associated with each of 3 levels of interaction (e.g., novice, generalist and expert) when provisioning storage for a medical application. The GUI and indicated 3 levels may correspond to those of FIG. 4.

If a user issues a request to provision storage for the medical application at the novice level, the user may select the application from a menu and indicate the host where the application is to execute. The foregoing may be the only inputs provided by the novice user. As indicated by element 952 for the novice level, the data storage system may automate the provisioning process using only the foregoing inputs based on defaults and application specific best practices that may be embodied, for example, in rules and rule processing or using other processes. In particular, the application best practices as encoded in rules of the data storage system may specify defaults used to automate storage provisioning in connection with virtual pool creation and configuration, application profile generation and copying to the desired host, retention classes, and automatic metadata generation for the virtual pools used by the application.

If a user issues a request to provision storage for the medical application at the generalist level as represented by 954, the user may select the application from a menu and indicate the host where the application is to execute. The data storage system may automate the creation and configuration of one or more virtual pools for the application and also for the application profile in accordance with application specific best practices. However, for a virtual pool created for use by the application with the request, the user may also specify a retention class and may also specify one or more items of metadata automatically associated with each object stored by the application in the virtual pool. Thus, the generalist may have knowledge of some particular features of the object-based system as related to retention class and automatic metadata generation without having additional knowledge regarding virtual pool configuration and the application profile. As such, the appropriate features about which the generalist has knowledge may be exposed to the user. Those features about which the generalist is not knowledgeable may utilize the automated and default best practices of the data storage system. It should be noted that in connection with the generalist level, the user may also be permitted to perform other operations and functions related to the particular feature retention classes. For example, a generalist may be allowed to define a new retention class or modify an existing retention class.

If a user issues a request to provision storage for the medical application at the expert level as represented by 956, the user may select the application from a menu and indicate the host where the application is to execute. The expert level user may be allowed to specify and perform operations in connection with virtual pools, retention classes, application profiles and automatic metadata generation. Thus, in connection with an expert level user, the user may optionally minimize the level of automation performed by the data storage system with respect to the foregoing object-based features by specifying his/her own inputs rather than relying on defaults selected by the data storage system in accordance with application-specific best practices.

The foregoing is an example of how control and automation (with respect to object-based features such as may be provided by the CAS layer 322 of FIG. 4) may vary for different levels of user interaction. As also described herein, the data storage system may automate implementation of CAS using other software layers, such as file system layer 324 and block storage layer 326, in accordance with application-specific best practices and defaults embodied in rules and rule processing as well as other suitable processes.

Figure 12:
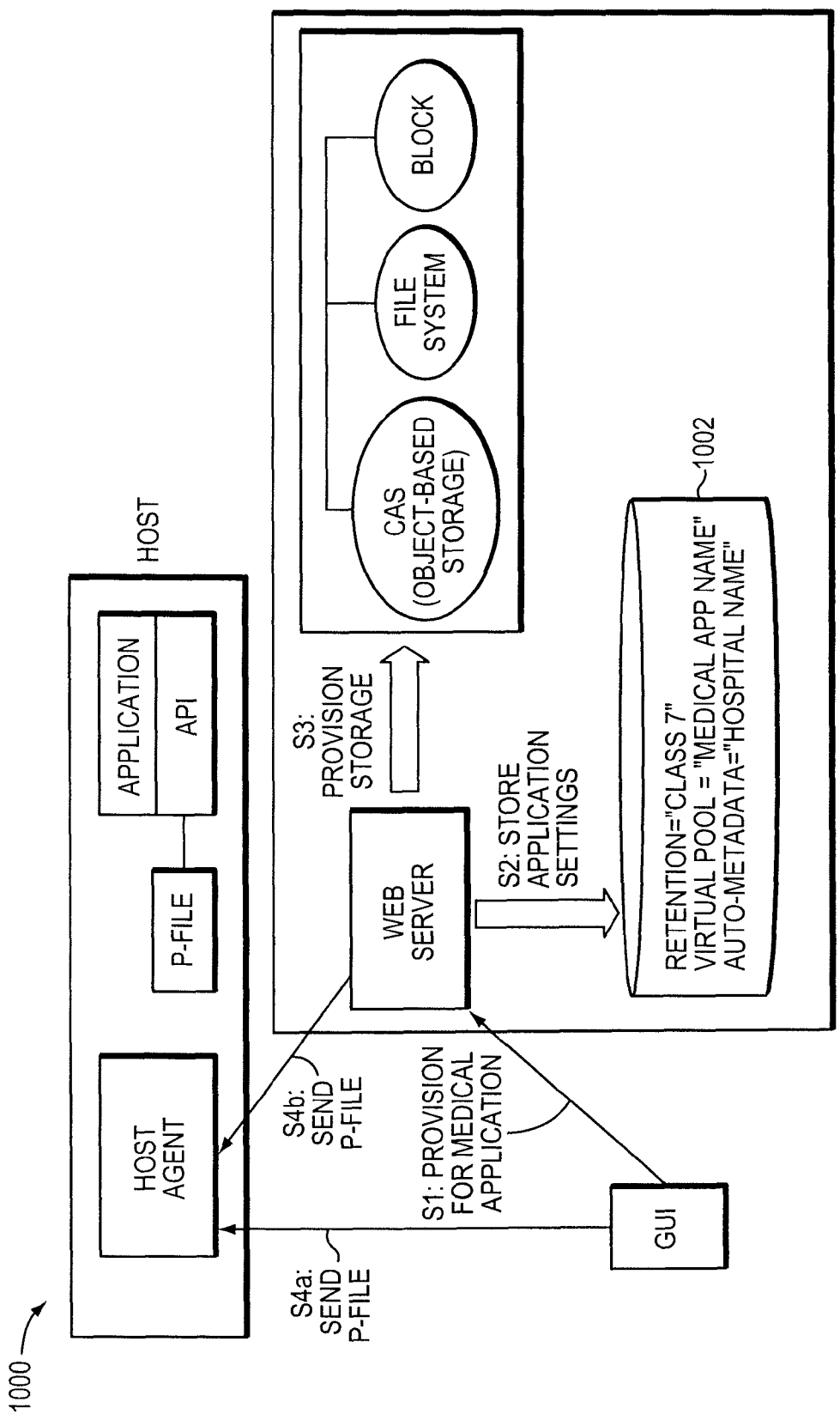
FIGS. 12, 15-17 are examples illustrating data flow and interaction between components of a system in accordance with techniques herein.

Referring to FIG. 12, shown is an example 1000 of processing that may be performed in connection with a provisioning request in an embodiment in accordance with processes herein. The example 1000 provides additional detail and illustrates a flow of processing steps as described above that may be performed in connection with issuing a request to provision storage for use with an application such as a medical application, executing on a host. FIG. 12 includes elements described above in connection with other figures, such as FIG. 4. As a first step S1, a user may issue the request to the data storage system using the GUI. In this example, the user may be interacting at a novice level where the user selects the medical application for which storage is being provisioned. The user also selects the host upon which the medical application will execute. In one embodiment, discovery processing may have been previously performed to obtain information regarding what hosts have connectivity to the GUI and data storage system and also what applications are executing on particular hosts. The user may be presented with a menu populated with appropriate portions of the foregoing discovery information so that a selection of a host and medical application executing thereon may be made. The host and medical application may be included in the provisioning request sent to the web server as indicated by S1. The web server may perform processing to provision the storage in accordance with defaults and best practices for the medical application. In this case, rules and rule processing may result in automatic specification of application settings which may be stored in a step S2 on the data storage system. Such settings as indicated by 1002 may include a virtual pool name indicating the virtual pool to be created for the medical application provisioning request, a retention class defined and included as a metadata attribute for all objects created by the application and stored in the virtual pool, and metadata that is automatically generated and included for all objects created by the application and stored in the virtual pool. The settings of 1002 may be used in connection with subsequent requests by the medical application, for example, to store objects in the virtual pool. Part of the automated processing may include creating the retention class definition as needed in addition to specifying that the retention class is to be included as an automatically generated portion of metadata for all objects stored in the named virtual pool "MEDICAL APP NAME".

In a step S3, the web server communicates with CAS and other software layers in order to provision the requested storage and create the virtual pool. As described herein in more detail, the data storage system includes code which embodies the template or process for provisioning storage for the medical application. Such processing may include, for example, configuring one or more block storage devices with appropriate device attributes, RAID level, and the like. One or more file systems may then be provisioned on the devices just configured. The foregoing one or more file systems may serve as the data store or container from which the CAS objects are created for use with the medical application.

The web server and/or GUI may then perform processing to automatically create the application profile or p-file and then also transmit the p-file to the host agent. The p-file may be transmitted to the host agent by the GUI (S4a), or alternatively by the web server (S4b) depending on which component(s) create the p-file. The host agent may store the p-file for subsequent use by the API when issuing requests to operate on objects of the virtual pool "MEDICAL APP NAME".

An embodiment in connection with processes herein may preconfigure block and/or file system level storage prior to receiving a provisioning request. For example, a data storage system may configure physical devices into RAID groups having a desired level of data protection prior to receiving any provisioning requests. Alternatively, processing for configuring the block and/or file systems used for a provisioning request may be performed in response to receiving the request.

The data storage system may also perform other processing in connection with requests made by an application, such as the medical application, to store an object in the virtual pool. For example, the data storage system may expect that all objects stored in a named virtual pool by the medical application should have a particular file format. For the medical application, the data storage system may expect that the content for an object has a particular format such as in accordance with a defined standard. If the content is not in accordance with this format, the data storage system may refuse to store objects having content which is of an unexpected format. The expected file format may be indicated in the application settings 1002. The CAS software layer of the data storage system may use information contained in metadata and/or object content in order to make a determination as to whether to accept/reject a write operation to write the object content. The file format of the object content may be determined, for example, by examining portions of the content to determine whether the portions contain an expected signature value. For example, one or more fields of the object content may be required by the standard to have one of a plurality of expected values. The fields may be checked to see if they contain valid values in accordance with the standard. Portions of the object metadata may also be examined. For example, a file format may be specified in object metadata communicated from the host. Thus, a determination as to whether to accept or reject object content for storage in a virtual pool may be based on interpretation of content in accordance with the expected signature and/or examination of object metadata.

As another example, the data storage system may accept or reject a request to store an object having content larger than a specified threshold size. The threshold size may also be specified and stored in the settings 1002. The data storage system may determine the size of received object content and use the threshold size to determine whether to allow the object content to be stored in the virtual pool. Application settings and options, such as the required file format and threshold size, may be specified by a user as a customization (e.g., as an input provided with the provisioning request) or using best practice application-specific defaults as described above in connection with other settings.

Figure 13:
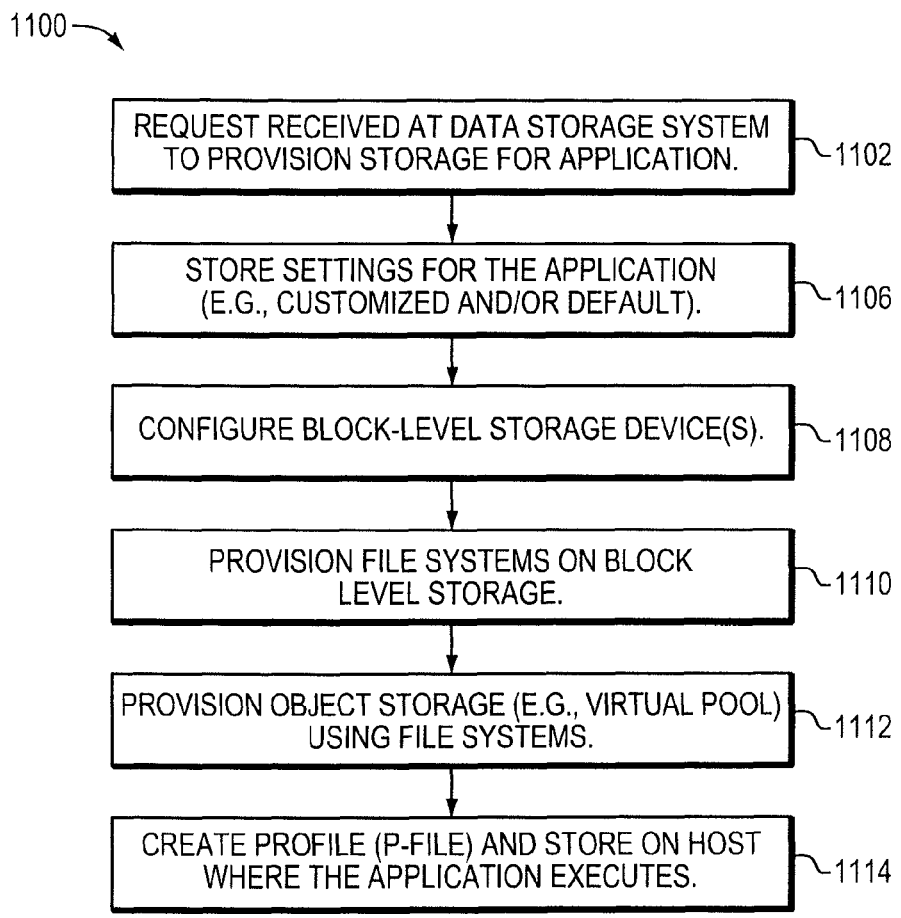
FIG. 13 is a flowchart illustrating processing steps that may be performed in an embodiment in accordance with processes herein for provisioning storage for an application.

Referring to FIG. 13, shown is a flowchart of processing steps that may be performed in an embodiment in accordance with processes herein for provisioning storage for an application. The flowchart 1100 summarizes processing described above. At step 1102, a request is received at the data storage system from the GUI to provision storage for a specified application. The request may optionally include one or more other inputs in accordance with the level of user interaction and any such information may also be transmitted to the data storage system. At step 1106, the settings for the application may be stored on the data storage system. The settings may include customized settings (e.g., as may be specified with the request based on additional user inputs) and/or default settings (e.g., as may be automatically provided by the data storage system in accordance with application specific best practices). At step 1108, the block level storage device(s) may be configured. At step 1110, the file system(s) may be provisioned on the block level storage devices configured in step 1108. At step 1112, the object storage or virtual pool may be provisioned using the file system(s) of step 1110. At step 1114, the application profile is created and stored on the host where the application executes (e.g., host from which the application will issue requests to operate on objects of the virtual pool). As noted above, the processing of steps 1108, 1110 and 1112 may vary with how the virtual object pools are implemented in an embodiment. Additionally, the foregoing processing of steps 1108, 1110 and/or 1112 may be performed prior to receiving the provisioning request in step 1102.

Figure 14:
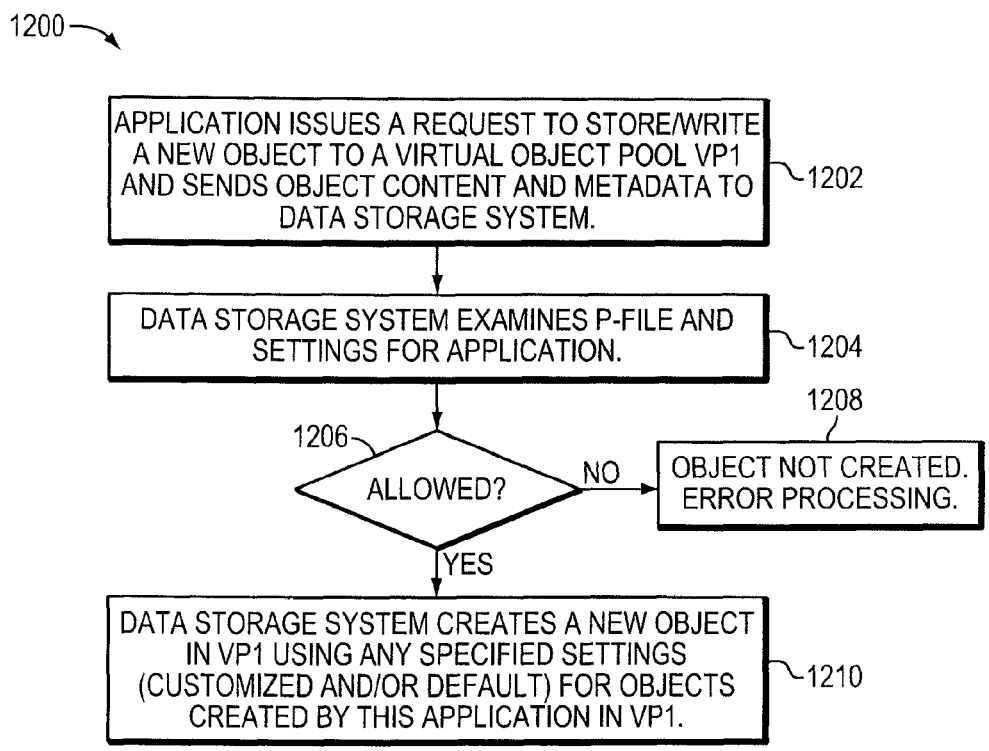
FIG. 14 is a flowchart of processing steps that may be performed in an embodiment in accordance with processes herein in connection with an application issuing a request to perform an operation with respect to an object of a virtual pool.

Referring to FIG. 14, shown is a flowchart of processing steps that may be performed in an embodiment in accordance with processes herein in connection with an application issuing a request to perform an operation with respect to an object of a virtual pool. The flowchart 1200 summarizes processing described above as may be performed by an application of a host for which storage has already been provisioned (such as by performing the steps of FIG. 13). At step 1202, the application issues a request to perform an operation with respect to an object of the virtual pool VP1. In this example, the operation may be to store or write a new object. Step 1202 may include sending the object content, metadata, and an application profile or p-file to the data storage system. It should be noted that as described above, a clip or transaction may include one or more objects, for purposes of illustration, only a single object is described with respect to FIG. 14. At step 1204, the data storage system examines the p-file and optionally the application settings and, at step 1206, determines whether to allow the requested operation. If step 1206 evaluates to no, step 1208 is performed. At step 1208, the operation is not performed (e.g., object not created/stored) and error processing may be performed to return a message to the requesting host and application. If step 1206 evaluates to yes, control proceeds to step 1210 to perform the requested operation. For example, if the operation is to create and store a new object in VP1, the new object is created and its content and metadata stored using any specified settings (e.g., automatic metadata generation, retention class, and the like, as may be specified in the settings for VP1). It should be noted that an embodiment may also include processing in addition to that of FIG. 14 for automatic metadata generation as described above. Furthermore, the data storage system may generally use the p-file when determining whether an application is allowed to perform any object operation including a request to write or store an object to a virtual object pool.

As described herein, an embodiment may use any one of a variety of different object-based software layers and implementations. For example, described above are exemplary embodiments using CAS. As another example, an embodiment may use an object-based process implemented in accordance with the XAM (Extensible Access Method) industry standard for object addressable storage.

The foregoing provides a flexible approach for automated implementation of best practices that can be customized in accordance with the particular application, data service, and/or data storage system. The best practices may vary with application as well as the particular data storage system. A user may select a level of interaction with the system in which the level selected varies the assumed knowledge or user sophistication, level of detail, and level of automation for the particular application. The user may select a level, such as a novice level level 1, to obtain a greater level of automation of best practices customized for the particular application. A user may also select to obtain a lesser level of automation of best practices as the user knowledge level and sophistication increases. The selected level may be associated with a particular user interface, level of automation and interaction with the data storage system for performing data services for a particular application. The automation of the best practices may be implemented using a variety of different frameworks and infrastructures. The exemplary one set forth herein, such as described in more detail in the '213 patent, uses a rule-based system although it will be appreciated by those skilled in the art that others are possible when implementing the processes set forth herein.

The foregoing processes provide for ease of use with automated configuration of an object-based storage system, such as a CAS system, for an application. In one embodiment, requesting the data storage system provision storage for a particular application causes automatic provisioning of virtual pools, automatic creation and specification of retention classes, automatic specification of metadata, and automatic generation and transmission of an application profile. Additional information may be provided with a request to provision storage for the application in accordance with a selected level of user interaction based on user knowledge where the additional information may be used to override defaults and/or limit the degree to which certain features are automated.

Figure 15:
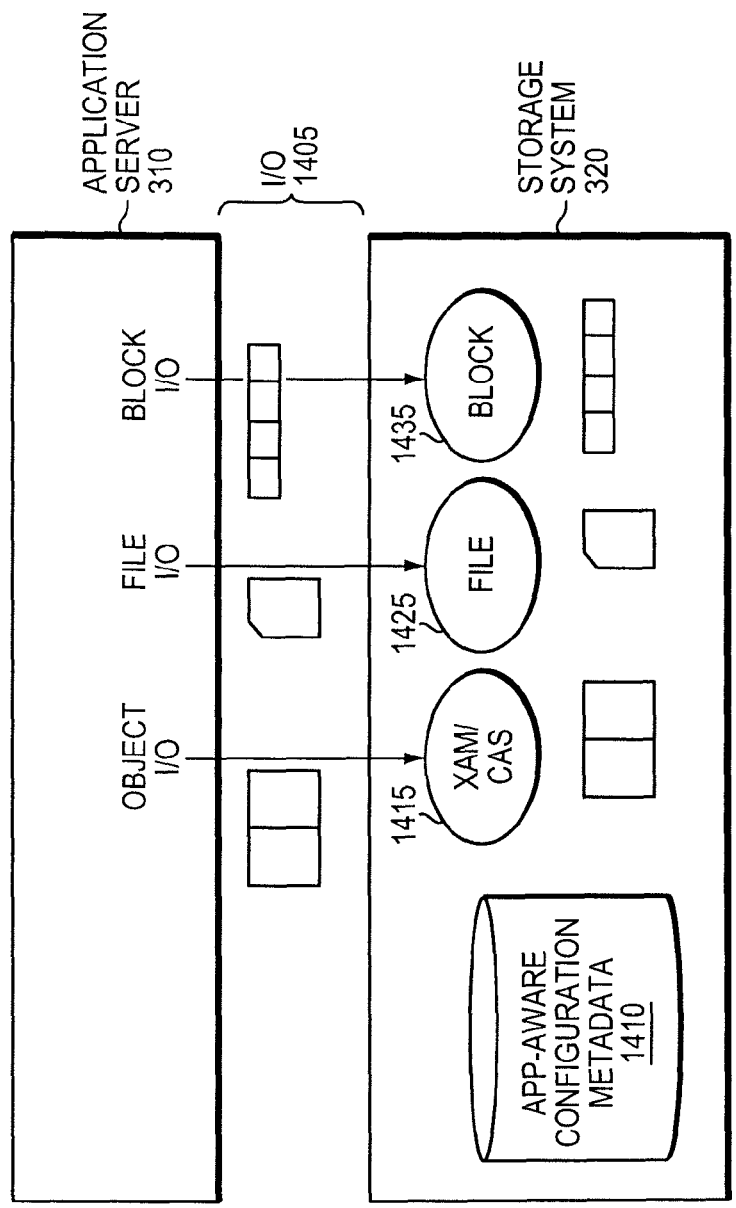

With reference now to FIGS. 12, 15-17, now described are examples of implementations of technology that may be used with the technique described herein for use in managing data storage for databases based on application awareness. In general as described below, information supplied along a control/management path is used in a data path to reject or quarantine I/Os that are inconsistent with such information. With reference to FIGS. 12, 15, control path includes steps S1, S2, S3 by which a user issues an application-based provisioning request to the data storage system using the GUI, and settings 1002 include application aware configuration metadata 1410. In particular, in the case of object-based (XAM/CAS) storage for example, in response to the request, the data storage system creates LUNs, builds a file system on top of the LUNs, assigns the file system to XAM or CAS technology as the case may be, retrieves a set of parameters for the application, and sets up the data storage system in accordance with the parameters. For example, if the application is a medical application, the parameters may specify that, e.g., X-ray data must be kept for seven years, a virtual pool is needed that only allows the medical application to access objects, and objects need to be populated automatically with metadata associating the object with a particular hospital. By use of application aware logic, the system avoids requiring the user to implement the settings manually after selecting the medical application as the subject of the provisioning. As described above, a p-file is set up that, among other things, helps identify users who are permitted to access objects in the virtual pool.

With reference to FIG. 15, data path includes I/O instances 1405 being directed from application server 310 to storage system 320, and specifically to XAM/CAS (object) 1415, file 1425, and block storage 1435 logic and interfaces depending on the type of I/O.

In each case, whether the I/O is object, file, or block type, as the I/O flows into system 320 or is stored in system 320, metadata 1410 is available that pertains to the application for which storage was provisioned in the control path. In particular, when the I/O arrives with its own content and metadata, this content and metadata can be mapped against metadata 1410 that is based on application aware provisioning.

In at least one implementation, metadata 1410 has requirements or guidelines as to characteristics of I/O that is acceptable or consistent with the application for which the provisioning was performed. Depending on the implementation, these characteristics may include or specify, for example, file formats, specific bit/byte sequences, and/or types of data such as X-ray, mortgage document, slideshow document, spreadsheet document.

Traditionally, with respect to database technology, a data storage system is where raw database tables, schemas, and the configuration of the database is stored, and database software and database algorithms execute on a server or host. For example, a customer may install database application on a server running Oracle Solaris or Microsoft Windows. In an example use case, the user issues a query which comes into the server CPU, and the query specifies accessing one database table and another database table, running a query against the two database tables, joining them together, and returning the results. In the example, it is required for the server CPU to issue read I/O into the data storage system, perform a join operation and send the results back out to the user.

In another example, a table may have four columns: name, age, address, and email address, which is typical for raw database tables in the data storage system, the database may have a name Customerdb, and in showing the table the first field may be a string called "name", and the next field may be an integer called "age". Other database configuration data may indicated such as whether the server should perform any tiering and whether any backups are specified.

In the traditional case, database information is stored on the data storage system in raw format in blocks such that the data storage system has no awareness that the data stored is for a database.

In view of the scale of how much data is being stored today, how huge databases are becoming, and how important it is to quickly mine them, traditional arrangements may take much too long in processing. In particular, latencies to move information from the database to the server and to use the server's memory and CPU to perform all of this work can be too long. Also, when it comes time to add a new data storage system, it is a complex operation, and trying to do so at scale is difficult.

In response, recent technology includes methods to have database algorithms execute outside the server, e.g., in a dedicated appliance or in the data storage system. Placing execution of such algorithms architecturally closer to the database stored on the data storage system helps reduce latencies and the burden on the server CPU. However, this does not help reduce the complexity of adding a new data storage system or otherwise scaling data storage for use by the database application. Current and new data storage systems still need to be configured, e.g., via storage management software, and changes also need to be made at the server to enable the server to access the new data storage system.

In particular with respect to the complexity of database configuration, a storage administrator has a set of manual steps to execute, including creating LUNs or/or file systems, defining and storing a database configuration and the layout of database tables (e.g., customer database tables), specifying the LUNs or file system on which such database tables will be stored, and, if snapshots or replication will be performed at a data storage level, setting snapshot/replication policies for LUNs for such tables, and/or mapping to a remote data storage system.

In the event the database runs out of LUN space or file system space, the storage administrator is faced with possibly installing another data storage system enclosure, linking it to the existing data storage system, creating new LUNs, modifying a database configuration to recognize the new LUNs, and "growing" tables to expand the tables onto the LUNs.

Recent technology allows situating execution of database algorithms on multiple servers with automatic handling of federation of systems and transparent aggregation, such that transparently nodes communicate with each other to manage the same database. In particular, in the case of a query operation, the nodes communicate with each other to determine which nodes have other rows, and to parallelize query, generate and aggregate results and return them to the originator of the query. Thus, a distributed scalable database can be presented, e.g., to the database application, as one large database.

Figure 16:
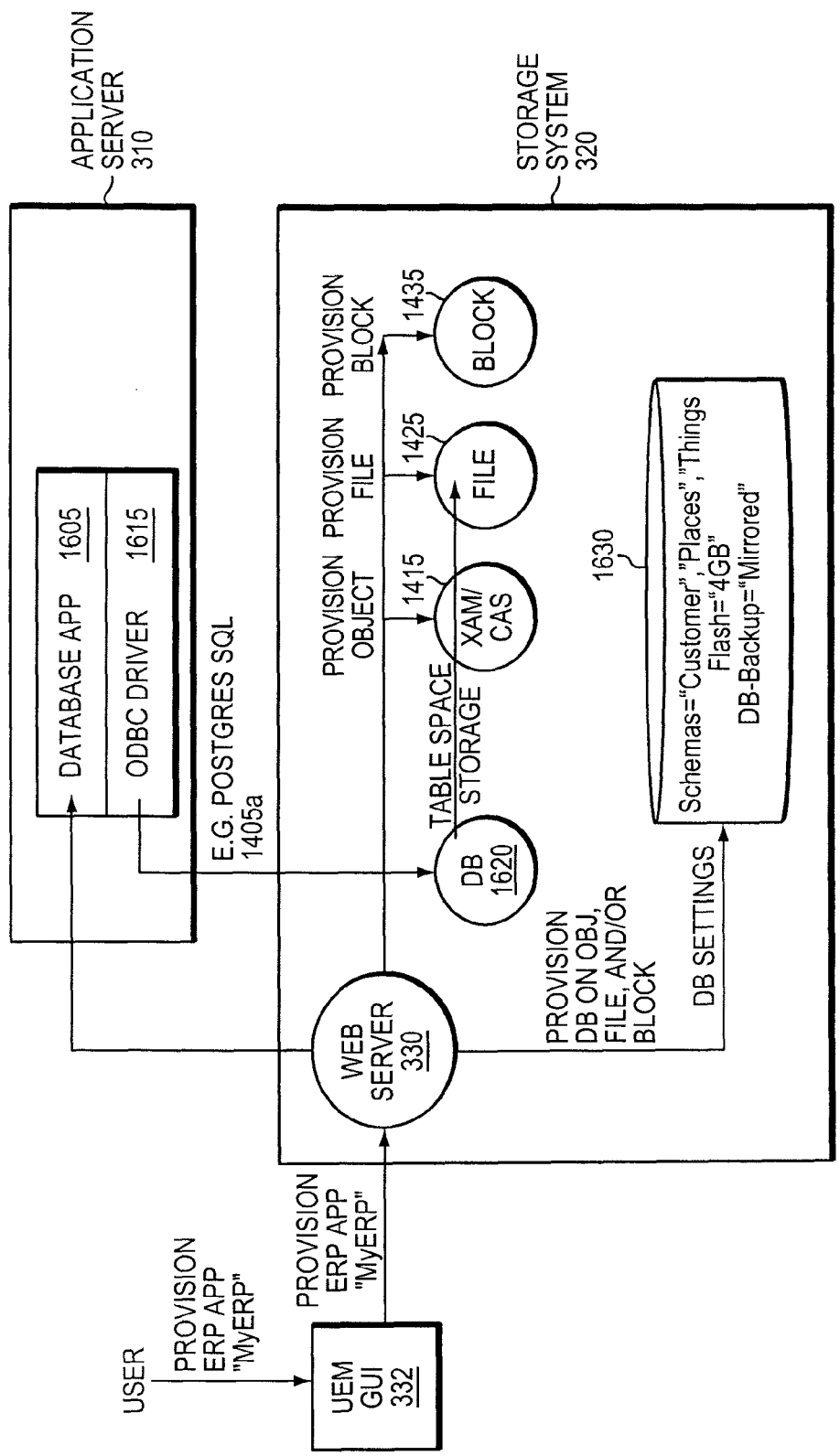

As illustrated in FIG. 16, in accordance with the technique described herein, database software 1620 including execution of database algorithms can be included in system 320, so that system 320 can have a database protocol interface to server 310 in addition to object (XAM/CAS), file, and block interfaces 1415, 1425, 1435 respectively. Server 310 runs database application 1605 and ODBC driver 1615. In addition, software 1620 can store its database tables on system 320 through file interface 1425 and/or block interface 1435. In an example, a single node instance of software 1620 may be installed on system 320 and supplied with file interface 1425 to present the database interface to server 310. In another example, a multi-node instance of software 1620 may be installed on system 320 and other data storage systems respectively, and the different nodes may communicate with each other to present the database interface to server 310. Both cases can benefit from application aware provisioning described generally above and specifically with respect to database related provisioning as described below.

With reference to FIG. 16 and the example illustrated therein, the user directs UEM GUI 332 for provisioning system 320, and selects provisioning system 320 for an enterprise resource planning (ERP) database application (e.g., application 1605), which may require a large scalable database. GUI 332 sends a command to Web server 330 to provision system 320 for an ERP database application with an ERP database named "MyERP". In the example, the user is a novice and knows nothing about storage system settings or tweaking them, so system 320 uses default settings that are already available within or to system 320 for the ERP database application, e.g., from storage 1630. Such default settings include an ERP database schema which is a customer schema with three columns for customers, places, and things, respectively; a setting to carve out 4 GB of data storage space on solid state disk drives (SSDs) for performance since certain LUNs will be heavily accessed; and a setting to use a mirroring backup scheme since the ERP database is mission critical.

Further in accordance with such provisioning, system 320 directs database software 1620, by default, to direct all of its tablespace to go on filesystems: if necessary beforehand system 320 uses interface 1435 to provision 20 GB of raw storage, and then uses interface 1425 to provision a filesystem on such raw storage, which results in a filesystem mount point that can be provided to software 1620 as a target location for storing its database tables. In the example, GUI 332 can also give database application 1605 an IP address as a location of the database protocol interface of system 320 and software 1620, and application 1605 can start sending database I/O (e.g., POSTGres, SQL queries 1405a) to such IP address. Thus, database queries may be sent directly to system 320 through its database protocol interface to software 1620.

Figure 17:
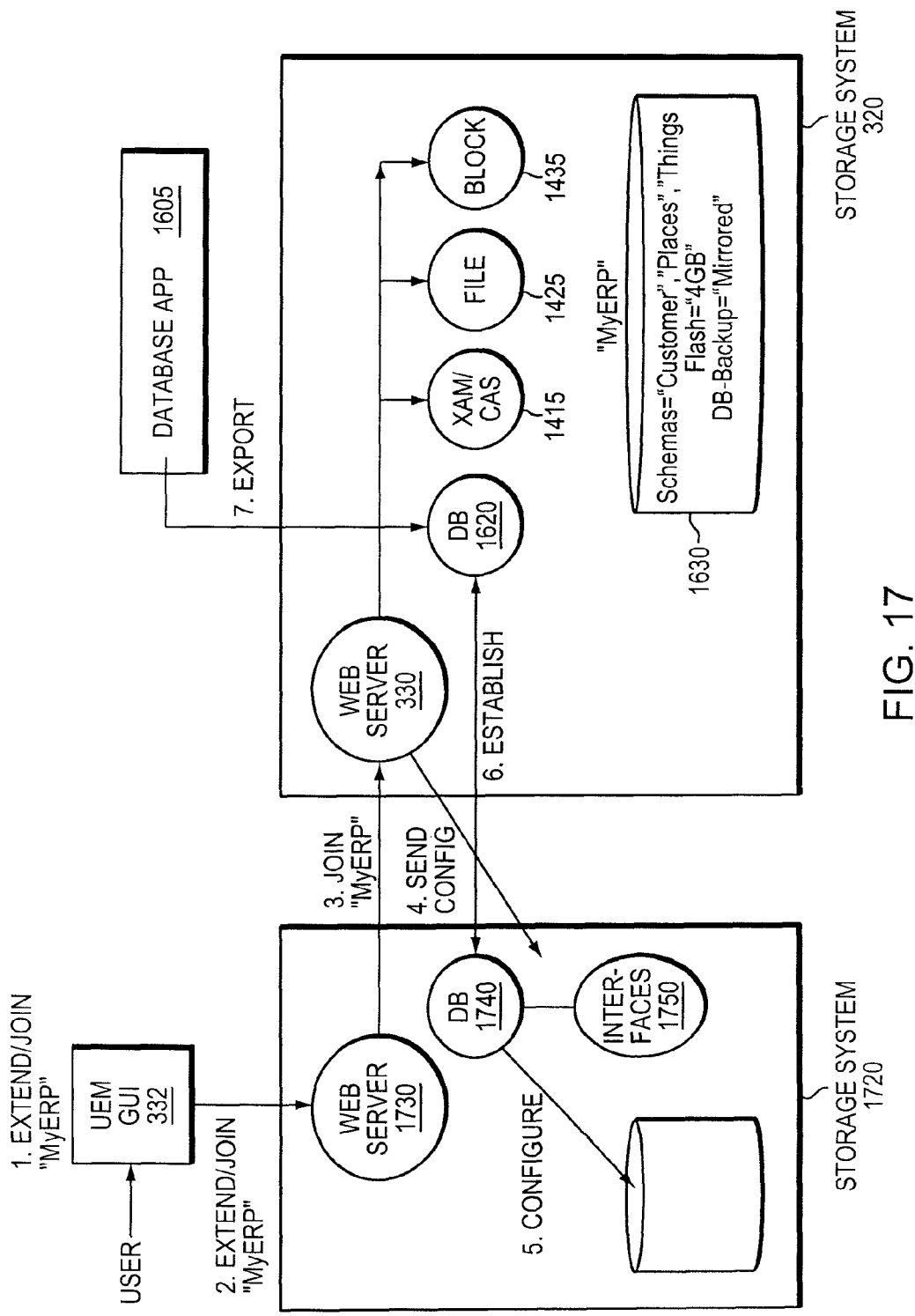

FIG. 17 illustrates a further enhancement leveraging a federation ability of software 1620, to help provision another storage system 1720 (e.g., with the same capabilities as system 320) for use with the MyERP database. In particular, automation is used to help avoid requiring the storage administrator or database administrator to perform manual steps for such provisioning. In the example of FIG. 17, the user requests and directs UEM GUI 332 to provision system 1720 for extending and joining database MyERP, which triggers seven automated steps following the user's request. In particular, the user gives the name (here, MyERP) used when provisioning original system 320. The request travels down to system 1720 and Web server 1730, which broadcasts to any compatible data storage system available, that system 1720 wants to join a database called MyERP. Web server 330 responds that system 320 is the master, original storage system for database MyERP, and also responds with a description of the configuration of database MyERP. Based on such description of the configuration, Web server 1730 provisions block and file system storage through interfaces 1740 (which include XAM/CAS, file system, and block interfaces) as described above for system 320 and otherwise finishes provisioning system 1720 as system 320 was provisioned above. At that point, system 1720 may have, for example, 100 GB of database space available to join database MyERP, and software 1740 is directed to establish communications between software 1740 and software 1620 so that software 1740 and software 1620 can interoperate as nodes communicating with each other to manage the same MyERP database. For example, software 1620, 1740 can respond when a new record is added in the database, by writing such new record in the new database space in system 1720, and/or when it comes time to distribute loads, by move database rows over to new system 1720. In addition, in at least some implementations, software 1620 may communicate with application 1605 to inform application 1605 that software 1740 is also available to accept database I/Os for the MyERP database, as a new or another mount point for the database, if application 1605 has a capability to exploit parallel entry points for the database to improve database performance.

Thus by use of the technique described herein, a complex configuration is reduced, by use of application aware provisioning techniques, down to two steps: setting up system 320 for the MyERP database, and then setting up system 1720 to join that existing MyERP database.

An embodiment may implement the techniques herein using code executed by a computer processor. For example, an embodiment may implement the techniques herein using code which is executed by a processor of the data storage system. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. For a data storage system comprising one or more storage devices, data path logic to manage data I/O operations with the one or more data storage devices, control path logic to provision storage on the data storage system, including a control path interface, a storage processor, and a database protocol interface, a method for use in managing data-storage on the one or more data storage devices for a database application executing on a server coupled to the data storage system based on application awareness, the method comprising:

storing application settings, including database schema information, corresponding to the database application, on the data storage system;

receiving, at the control path interface, an instruction to provision storage on the data storage system for the database application;

in response to receiving the instruction, the control path interface accessing the application settings to automatically provision storage on the one or more storage devices for the database application; and the database protocol interface accepting database queries directly from the server.

2. The method of claim 1, wherein the control path interface automatically provisions the data storage system for scaling of a storage-embedded database.

3. The method of claim 1, wherein an application-aware joining process allows a new data storage system to scale an application database of the data storage system.

4. The method of claim 1, wherein a storage-resident database is provisioned on the data storage system in the terms of an application that is using the storage-resident database, with tables and storage space of the storage-resident database being automatically allocated and generated.

5. The method of claim 1, wherein when database capacity in the form of new data storage is added to a database on the data storage system, the new data storage is instructed to join the database, and provisioning, allocation, and generation steps necessary for the joining are processed automatically.

6. The method of claim 1, providing, in the data storage system, a file system interface to the one or more storage devices, and
wherein the database protocol interface and the file system interface present a database interface to the server.

7. The method of claim 1, wherein the data storage system is embodied on one or more first devices, and the server is embodied on one or more second devices that are physically separate from the one or more first devices.

8. The method of claim 1, wherein the data storage system executes a general purpose operating system.

9. For a data storage system comprising one or more storage devices, data path logic to manage data I/O operations with the one or more data storage devices, control path logic to provision storage on the data storage system, including a control path interface, a storage processor, and a database protocol interface, a method for use in managing data storage on the one or more data storage devices for a database application executing on a server coupled to the data storage system based on application awareness, the method comprising:

storing application settings, including database schema information, corresponding to the database application, on the data storage system;

receiving, at the control path interface, an instruction to provision storage on the data storage system for the database application;

in response to receiving the instruction, the control path interface accessing the application settings to automatically provision the data storage system as a first node for the database application;

the database protocol interface accepting database queries directly from the server; and automatically joining another data storage system as a second node for the database application.

10. The method of claim 9, wherein the provisioning provisions the data storage system for scaling of a storage-embedded database.

11. The method of claim 9, wherein an application-aware joining process allows a new data storage system to scale an application database of the data storage system.

12. The method of claim 9, wherein a storage-resident database is provisioned on the data storage system in the terms of an application that is using the storage-resident database, with tables and storage space of the storage-resident database being automatically allocated and generated.

13. The method of claim 9, wherein when database capacity in the form of new data storage is added to a database on the data storage system, the new data storage is instructed to join the database, and provisioning, allocation, and generation steps necessary for the joining are processed automatically.

14. The method of claim 9, wherein the data storage system executes a general purpose operating system.

15. A data storage system for use in managing data storage for a database application executing on a server coupled to the data storage system based on application awareness, the data storage system comprising:

a storage processor;

one or more storage devices with application settings, including database schema information, corresponding to the database application stored thereon;

data path logic to manage data I/O operations with the one or more data storage devices;

control path logic to provision storage on the data storage system, including a control path interface to receive an instruction to provision storage on the data storage system for the database application, access the application settings, and automatically provision storage on the one or more storage devices for the database application; and a database protocol interface to accept database queries directly from the server.

16. The system of claim 15, wherein the control path interface is configured to provision, automatically, the data storage system for scaling of a storage-embedded database.

17. The system of claim 15, further comprising:
logic to execute an application-aware joining process that allows a new data storage system to scale an application database of the data storage system.

18. The system of claim 15, further comprising:
a storage-resident database on the data storage system provisioned in the terms of an application that is using the storage-resident database, and
logic to allocate and generate, automatically, tables and storage space of the storage-resident database.

19. The system of claim 15, further comprising
logic to instruct the new data storage to join the database when database capacity in the form of new data storage is added to a database on the data storage system; and
logic to process, automatically, provisioning, allocation, and generation steps necessary for the joining.

20. The method of claim 15, wherein the data storage system executes a general purpose operating system.

* * * * *